(12) United States Patent
Ogawa

(10) Patent No.: US 10,444,487 B2
(45) Date of Patent: Oct. 15, 2019

(54) POLARIZED IMAGE ACQUISITION APPARATUS, PATTERN INSPECTION APPARATUS, POLARIZED IMAGE ACQUISITION METHOD, AND PATTERN INSPECTION METHOD

(71) Applicant: NuFlare Technology, Inc., Yokohama-shi (JP)

(72) Inventor: Riki Ogawa, Kawasaki (JP)

(73) Assignee: NuFlare Technology, Inc., Yokohama-shi (JP)

( * ) Notice: Subject to any disclaimer, the term of this patent is extended or adjusted under 35 U.S.C. 154(b) by 0 days.

(21) Appl. No.: 15/995,847

(22) Filed: Jun. 1, 2018

(65) Prior Publication Data

US 2018/0364472 A1     Dec. 20, 2018

(30) Foreign Application Priority Data

Jun. 19, 2017   (JP) .................................. 2017-119850

(51) Int. Cl.
| G02B 27/09 | (2006.01) |
| G02B 27/12 | (2006.01) |
| G02B 21/36 | (2006.01) |
| G02B 21/26 | (2006.01) |
| G02B 21/02 | (2006.01) |
| G02B 27/28 | (2006.01) |
| G06T 7/00 | (2017.01) |

(52) U.S. Cl.
CPC ........... *G02B 21/367* (2013.01); *G02B 21/02* (2013.01); *G02B 21/26* (2013.01); *G02B 27/126* (2013.01); *G02B 27/286* (2013.01); *G06T 7/001* (2013.01); *G06T 2207/10004* (2013.01); *G06T 2207/30148* (2013.01)

(58) Field of Classification Search
CPC .............. G02B 27/0905; G02B 27/126; G06T 2207/30148
USPC .......................................................... 348/92
See application file for complete search history.

(56) References Cited

U.S. PATENT DOCUMENTS

2012/0092669 A1*  4/2012  Fiolka ................ G01M 11/0257
356/365

FOREIGN PATENT DOCUMENTS

| JP | 2001-235853 | 8/2001 |
| JP | 2017-90147 | 5/2017 |

\* cited by examiner

*Primary Examiner* — Jeffery A Williams
(74) *Attorney, Agent, or Firm* — Oblon, McClelland, Maier & Neustadt, L.L.P.

(57) ABSTRACT

A polarized image acquisition apparatus includes a rotatable diaphragm to restrict a passage region of light passed through an objective lens to two regions mutually opposite across the central axis in 4n equal regions divided rotationally symmetrically in the plane orthogonal to the traveling direction of the light passed through the objective lens, and to change the angle of the passage region so that each two regions of the 4n equal regions become passage regions in order; and a rotating half-wave plate to convert, for each angle of the passage region, a P-polarized component passed through the diaphragm, in the same direction as the angle of the passage region, and an S-polarized component passed through the diaphragm, orthogonal to the angle of the passage region, into polarized waves in orthogonal first and second directions.

10 Claims, 11 Drawing Sheets

Mask — 1/4 → Wafer

Mask — 200 to 500 times → Sensor

NAo : 0.9     NAi : 0.004
NAo : 0.35    NAi : 0.001

| | Exposure Apparatus | Inspection Apparatus |
|---|---|---|
| NAi | Large | Small |
| S Wave (Intensity) | Same | Same |
| P Wave (Intensity) | Small | Same |

S Polarization

P Polarization

POLARIZED IMAGE ACQUISITION APPARATUS, PATTERN INSPECTION APPARATUS, POLARIZED IMAGE ACQUISITION METHOD, AND PATTERN INSPECTION METHOD

CROSS-REFERENCE TO RELATED APPLICATION

This application is based upon and claims the benefit of priority from the prior Japanese Patent Application No. 2017-119850 filed on Jun. 19, 2017 in Japan, the entire contents of which are incorporated herein by reference.

BACKGROUND OF THE INVENTION

Field of the Invention

Embodiments of the present invention relate to a polarized image acquisition apparatus, pattern inspection apparatus, polarized image acquisition method, and pattern inspection method. For example, they relate to an apparatus and method which acquires a polarized image to be used for generating an exposure image of an exposure mask substrate used in semiconductor manufacturing, and to an apparatus and method which inspects a pattern defect of the exposure mask substrate.

Description of Related Art

In recent years, with the advance of high integration and large capacity of large-scale integration (LSI) circuits, the line width (critical dimension) required for circuits of semiconductor elements is becoming progressively narrower. Such semiconductor elements are manufactured by circuit formation of exposing and transferring a pattern onto a wafer by means of a reduced projection exposure apparatus known as a stepper while using an original or "master" pattern (also called a mask or a reticle, hereinafter generically referred to as a mask) with a circuit pattern formed thereon. Then, in fabricating a mask for transfer printing such a fine circuit pattern onto a wafer, a pattern writing apparatus capable of writing or "drawing" fine circuit patterns needs to be employed. Pattern circuits may be written directly on the wafer by the pattern writing apparatus. Also, a laser beam writing apparatus that uses laser beams in place of electron beams for writing a pattern is under development.

Since LSI manufacturing requires a tremendous amount of manufacturing cost, it is crucial to improve its yield. However, as typified by a 1-gigabit DRAM (Dynamic Random Access Memory), the scale of patterns configuring an LSI has become on the order of nanometers from submicrons. One of major factors that decrease the yield of the LSI manufacturing is due to pattern defects on the mask used for exposing and transfer printing an ultrafine pattern onto a semiconductor wafer by the photolithography technology. In recent years, with miniaturization of dimensions of LSI patterns formed on a semiconductor wafer, dimension to be detected as a pattern defect has become extremely small. Therefore, the pattern inspection apparatus for inspecting defects on a transfer mask used in manufacturing LSI needs to be more highly accurate.

As an inspection method, there is known a method of comparing an optical image obtained by imaging a pattern formed on a target object or "sample" such as a lithography mask at a predetermined magnification, by using a magnification optical system, with design data or an optical image obtained by imaging the same pattern on the target object. For example, the methods described below are known as pattern inspection methods: the "die-to-die inspection" method that compares data of optical images of identical patterns at different positions on the same mask; and the "die-to-database inspection" method that inputs, into an inspection apparatus, writing data (design pattern data) generated by converting pattern-designed CAD data to a writing apparatus specific format to be input to the writing apparatus when a pattern is written on the mask, generates a design image (reference image) based on the input writing data, and compares the generated design image with an optical image (serving as measured target data) obtained by imaging the pattern. In such inspection methods for use in the inspection apparatus, a target object is placed on the stage so that a light flux may scan the target object as the stage moves in order to perform an inspection. Specifically, the target object is irradiated with a light flux from the light source through the illumination optical system. The light transmitted through the target object or reflected therefrom forms an image on a sensor through the optical system. The image captured by the sensor is transmitted as measured target data to the comparison circuit. After performing positioning between images, the comparison circuit compares the measured target data with reference data in accordance with an appropriate algorithm, and determines that there exists a pattern defect if the compared data are not identical.

Since the product cycle of semiconductor products is generally short, reducing the time required to manufacture them is an important point. If a mask pattern having a defect is exposed and transferred to a wafer, semiconductor devices made using the wafer become defective. Therefore, it is essential to inspect mask patterns for defects. Defects found in the inspection are corrected by a defect correction apparatus. However, if all the found defects are corrected, it results in increasing the required manufacturing time, thereby decreasing the product value. With the development of the inspection apparatus, it is determined that there is a pattern defect even if a very small deviation occurs. However, when actually transfer-printing a mask pattern onto a wafer by an exposure apparatus, as long as no circuit disconnection and/or no short circuit occurs on the wafer due to such a pattern defect, the circuit can be used as an integrated circuit. Therefore, it is desired to acquire an exposure image exposed on the wafer by the exposure apparatus. However, in the exposure apparatus, mask patterns are reduced to be focused and formed on the wafer, but, in the inspection apparatus, mask patterns are magnified to be focused and formed on the sensor. Thus, their configurations of the optical system on the secondary side to the mask substrate are different from each other in the first place. Therefore, even if the state of an illumination light is made to suit the exposure apparatus, as long as the configuration remains unchanged, it is difficult for the inspection apparatus to reproduce a pattern image which is to be transfer printed (exposed and transferred) by the exposure apparatus.

Regarding the above, there is disclosed a dedicated device which inspects, using an aerial image, an exposure image to be exposed and transferred by the exposure apparatus (e.g., refer to Japanese Patent Application Laid-open (JP-A) No. 2001-235853).

As described above, it is requested to reproduce a pattern image which is to be transfer printed by the exposure apparatus. Then, in order to generate an exposure image to be transfer-printed by the exposure apparatus, the present inventor has filed Japanese Patent Application No. 2015-218287 regarding a method for capturing images after performing separation between the P and S polarized waves, which is not yet publicly known at the application date of Japanese Patent Application No. 2017-119850 serving as a basis of claim of priority of the present application. The contents of Japanese Patent Application No. 2017-119850 are incorporated in here. By the method described in the filed application, although it becomes possible to perform imaging (capture an image) the P and S polarized waves simultaneously, the method of image capturing while separating the P and S polarized waves is not limited to the filed method. Therefore, it is also requested to develop in other configurations the method of image capturing after separating the P and S polarized waves.

Although it becomes possible to perform imaging the P and S polarized waves simultaneously according to the method described in the filed application, if performing a general pattern inspection where a pattern image, not a polarized image, is captured to be compared, it becomes difficult to conduct a transmission inspection and a reflection inspection simultaneously. In the transmission inspection and the reflection inspection, different positions on the target object surface are simultaneously irradiated with respective inspection lights, and imaging is performed treating a pattern at one of the different positions as a transmitted image, and a pattern at the other of the different positions as a reflected image. Thereby, since the images do not overlap each other in transmission and reflection, each image can be captured with great precision. However, in the method where imaging is performed while performing separation between the P and S polarized waves, if the same image forming optical system is used to separate an image at one position into a P-polarized wave and an S-polarized wave, the image formation position is displaced from that of the image in the case of simultaneously performing a transmission inspection and a reflection inspection. Therefore, it is requested to develop a new mechanism which can use an image forming optical system in common between polarized image acquisition and general pattern inspection.

Furthermore, for making an obtained image close to an exposure image as much as possible, it is desirable to have a further degree of freedom in addition to only two images of the P-polarized wave and S-polarized wave.

BRIEF SUMMARY OF THE INVENTION

According to one aspect of the present invention, a polarized image acquisition apparatus includes:

a stage configured to be movable and to mount thereon a mask substrate for exposure on which a pattern is formed;

an objective lens configured to receive a transmitted light having passed through the mask substrate;

a diaphragm configured to be rotatable, to restrict a passage region of a light having passed through the objective lens to two regions opposite to each other with respect to a central axis in 4n equal regions divided rotationally symmetrically in a plane orthogonal to a traveling direction of the light having passed through the objective lens, and to change an angle of the passage region so that each the two regions of the 4n equal regions become passage regions in order;

a rotating half-wave plate configured to convert, for each of the angle of the passage region, a P-polarized component having passed through the diaphragm and being in same direction as the angle of the passage region and an S-polarized component having passed through the diaphragm and being in a direction orthogonal to the angle of the passage region into a polarized wave in a first direction and a polarized wave in a second direction, where the first and second directions have been set previously and are orthogonal to each other;

a Rochon prism configured to separate a trajectory of the polarized wave in the first direction from a trajectory of the polarized wave in the second direction;

an image forming lens configured to focus and form an image of the polarized wave in the first direction having passed through the Rochon prism, at an image formation position, and an image of the polarized wave in the second direction having passed through the Rochon prism, at an other image formation position;

a mirror configured to reflect the polarized wave in the second direction, at the other image formation position of the polarized wave in the second direction which is different from the image formation position of the polarized wave in the first direction;

a first image sensor configured to capture an optical image of a polarized wave of the P-polarized component and an optical image of a polarized wave of the S-polarized component, as an optical image of the polarized wave in the first direction, while replacing the optical image of the polarized wave of the P-polarized component and the optical image of the polarized wave of the S-polarized component with each other depending on the angle of the passage region of the diaphragm; and a second image sensor configured to capture an optical image of a polarized wave of the S-polarized component and an optical image of a polarized wave of the P-polarized component, as an optical image of the polarized wave in the second direction, while replacing the optical image of the polarized wave of the S-polarized component and the optical image of the polarized wave of the P-polarized component with each other depending on the angle of the passage region of the diaphragm.

According to another aspect of the present invention, a pattern inspection apparatus includes:

a stage configured to be movable and to mount thereon a mask substrate for exposure on which a pattern is formed;

an objective lens configured to receive a transmitted light having passed through the mask substrate;

a diaphragm configured to be rotatable, to restrict a passage region of a light having passed through the objective lens to two regions opposite to each other with respect to a central axis in 4n equal regions divided rotationally symmetrically in a plane orthogonal to a traveling direction of the light having passed through the objective lens, and to change an angle of the passage region so that each the two regions of the 4n equal regions become passage regions in order;

a rotating half-wave plate configured to convert a P-polarized component having passed through the diaphragm and being in same direction as the angle of the passage region and an S-polarized component having passed through the diaphragm and being in a direction orthogonal to the angle of the passage region into a polarized wave in a first direction and a polarized wave in a second direction, where the first and second directions have been set previously and are orthogonal to each other;

a Rochon prism configured to separate a trajectory of the polarized wave in the first direction from a trajectory of the polarized wave in the second direction;

an image forming lens configured to focus and form an image of the polarized wave in the first direction having passed through the Rochon prism, at an image formation position, and an image of the polarized wave in the second direction having passed through the Rochon prism, at an other image formation position;

a mirror configured to reflect the polarized wave in the second direction, at the other image formation position of the polarized wave in the second direction which is different from the image formation position of the polarized wave in the first direction;

a first image sensor configured to capture an optical image of a polarized wave of the P-polarized component and an optical image of a polarized wave of the S-polarized component, as an optical image of the polarized wave in the first direction, while replacing the optical image of the polarized wave of the P-polarized component and the optical image of the polarized wave of the S-polarized component with each other depending on the angle of the passage region of the diaphragm;

a second image sensor configured to capture an optical image of a polarized wave of the S-polarized component and an optical image of a polarized wave of the P-polarized component, as an optical image of the polarized wave in the second direction, while replacing the optical image of the polarized wave of the S-polarized component and the optical image of the polarized wave of the P-polarized component with each other depending on the angle of the passage region of the diaphragm;

a beam splitter configured to branch an illumination light to go to the objective lens, and make a reflected light from the mask substrate pass through the beam splitter itself via the objective lens;

a first transfer mechanism configured to move the diaphragm, the rotating half-wave plate, and the Rochon prism between an inside and an outside of an optical path; and a second transfer mechanism configured to move the beam splitter between the inside and the outside of the optical path, wherein, the diaphragm, the rotating half-wave plate, and the Rochon prism are arranged instead of the beam splitter, in the optical path in a case where a polarized image is acquired, and the beam splitter is arranged instead of the diaphragm, the rotating half-wave plate, and the Rochon prism, in the optical path in a case where a pattern inspection is performed, the image forming lens, in the case where the pattern inspection is performed, focuses and forms an image of one of the transmitted light and the reflected light, at the image formation position of the polarized wave in the first direction, and focuses and forms an image of an other one of the transmitted light and the reflected light, at the other image formation position of the polarized wave in the second direction, the mirror, in the case where the pattern inspection is performed, reflects the other one of the transmitted light and the reflected light, at the other image formation position of the polarized wave in the second direction, the first image sensor, in the case where the pattern inspection is performed, captures the image of the one of the transmitted light and the reflected light, and the second image sensor, in the case where the pattern inspection is performed, captures the image of the other one of the transmitted light and the reflected light.

According to yet another aspect of the present invention, a polarized image acquisition method includes:

focusing an illumination light to form an image on a mask substrate for exposure on which a pattern is formed;

receiving a transmitted light having passed through the mask substrate by focusing the illumination light, into an objective lens;

restricting a passage region of the transmitted light having passed through the objective lens, using a diaphragm being rotatable and including two open regions opposite to each other with respect to a central axis in 4n equal regions divided rotationally symmetrically in a plane orthogonal to a traveling direction of the transmitted light having passed through the objective lens, to the two open regions, and changing an angle of the passage region so that each the two open regions of the 4n equal regions become passage regions in order;

converting, by using a rotating half-wave plate, for each of the angle of the passage region, a P-polarized component which has passed through the diaphragm and is in same direction as the angle of the passage region and an S-polarized component which has passed through the diaphragm and is in a direction orthogonal to the angle of the passage region into a polarized wave in a first direction and a polarized wave in a second direction, where the first and second directions have been set previously and are orthogonal to each other;

separating a trajectory of the polarized wave in the first direction from a trajectory of the polarized wave in the second direction by using a Rochon prism;

focusing, by using an image forming lens, to form an image of the polarized wave in the first direction having passed through the Rochon prism, at an image formation position, and an image of the polarized wave in the second direction having passed through the Rochon prism, at an other image formation position;

reflecting, by using a mirror, the polarized wave in the second direction, at the other image formation position of the polarized wave in the second direction which is different from the image formation position of the polarized wave in the first direction;

capturing, by using a first image sensor, an optical image of a polarized wave of the P-polarized component and an optical image of a polarized wave of the S-polarized component, as an optical image of the polarized wave in the first direction, while replacing the optical image of the polarized wave of the P-polarized component and the optical image of the polarized wave of the S-polarized component with each other depending on the angle of the passage region of the diaphragm; and capturing, by using a second image sensor, an optical image of a polarized wave of the S-polarized component and an optical image of a polarized wave of the P-polarized component, as an optical image of the polarized wave in the second direction, while replacing the optical image of the polarized wave of the S-polarized component and the optical image of the polarized wave of the P-polarized component with each other depending on the angle of the passage region of the diaphragm.

According to yet another aspect of the present invention, a pattern inspection method includes:

focusing a first illumination light to form an image on a mask substrate for exposure on which a pattern is formed;

receiving a first transmitted light having passed through the mask substrate by focusing the first illumination light, into an objective lens;

restricting a passage region of the first transmitted light having passed through the objective lens, by using a diaphragm being rotatable and including two open regions opposite to each other with respect to a central axis in 4n equal regions divided rotationally symmetrically in a plane orthogonal to a traveling direction of the first transmitted light having passed through the objective lens, to the two open regions, and changing an angle of the passage region so that each the two open regions of the 4n equal regions become passage regions in order;

converting, by using a rotating half-wave plate, for each of the angle of the passage region, a P-polarized component, which has passed through the diaphragm and is in same direction as the angle of the passage region, into a polarized wave in a first direction, and an S-polarized component, which has passed through the diaphragm and is in a direction orthogonal to the angle of the passage region, into a polarized wave in a second direction, where the first and second directions have been set previously and are orthogonal to each other;

separating, by using a Rochon prism, a trajectory of the polarized wave in the first direction from a trajectory of the polarized wave in the second direction;

focusing, by using an image forming lens, to form an image of the polarized wave in the first direction having passed through the Rochon prism, at an image formation position, and an image of the polarized wave in the second direction having passed through the Rochon prism, at an other image formation position;

reflecting, by using a mirror, the polarized wave in the second direction, at the other image formation position of the polarized wave in the second direction which is different from the image formation position of the polarized wave in the first direction;

capturing, by using a first image sensor, an optical image of a polarized wave of the P-polarized component and an optical image of a polarized wave of the S-polarized component, as an optical image of the polarized wave in the first direction, while replacing the optical image of the polarized wave of the P-polarized component and the optical image of the polarized wave of the S-polarized component with each other depending on the angle of the passage region of the diaphragm;

capturing, by using a second image sensor, an optical image of a polarized wave of the S-polarized component and an optical image of a polarized wave of the P-polarized component, as an optical image of the polarized wave in the second direction, while replacing the optical image of the polarized wave of the S-polarized component and the optical image of the polarized wave of the P-polarized component with each other depending on the angle of the passage region of the diaphragm;

moving the diaphragm, the rotating half-wave plate, and the Rochon prism from an inside to an outside of an optical path;

moving a beam splitter from the outside to the inside of the optical path;

illuminating the mask substrate with a second illumination light by using a transmission inspection illumination optical system;

illuminating the mask substrate with a third illumination light by using a reflection inspection illumination optical system;

receiving a second transmitted light having passed through the mask substrate by the second illumination light, and a reflected light having been reflected from the mask substrate by the third illumination light, into the image forming lens through the objective lens and the beam splitter;

focusing and imaging, by using the image forming lens, one of the second transmitted light and the reflected light, at the image formation position of the polarized wave in the first direction, and an other one of the second transmitted light and the reflected light, at the other image formation position of the polarized wave in the second direction;

reflecting, by using the mirror, the other one of the second transmitted light and the reflected light, at the other image formation position of the polarized wave in the second direction;

capturing, by using the first image sensor, an image of the one of the second transmitted light and the reflected light; and capturing, by using the second image sensor, an image of the other one of the second transmitted light and the reflected light.

DETAILED DESCRIPTION OF THE INVENTION

Embodiments below describe an apparatus and method which acquires a polarized image to be used for generating an exposure image transfer-printed by the exposure apparatus while enhancing a degree of freedom. Moreover, Embodiments below describe an apparatus and method which can use the image forming optical system in common between polarized image acquisition and general pattern inspection.

First Embodiment

Figure 1:
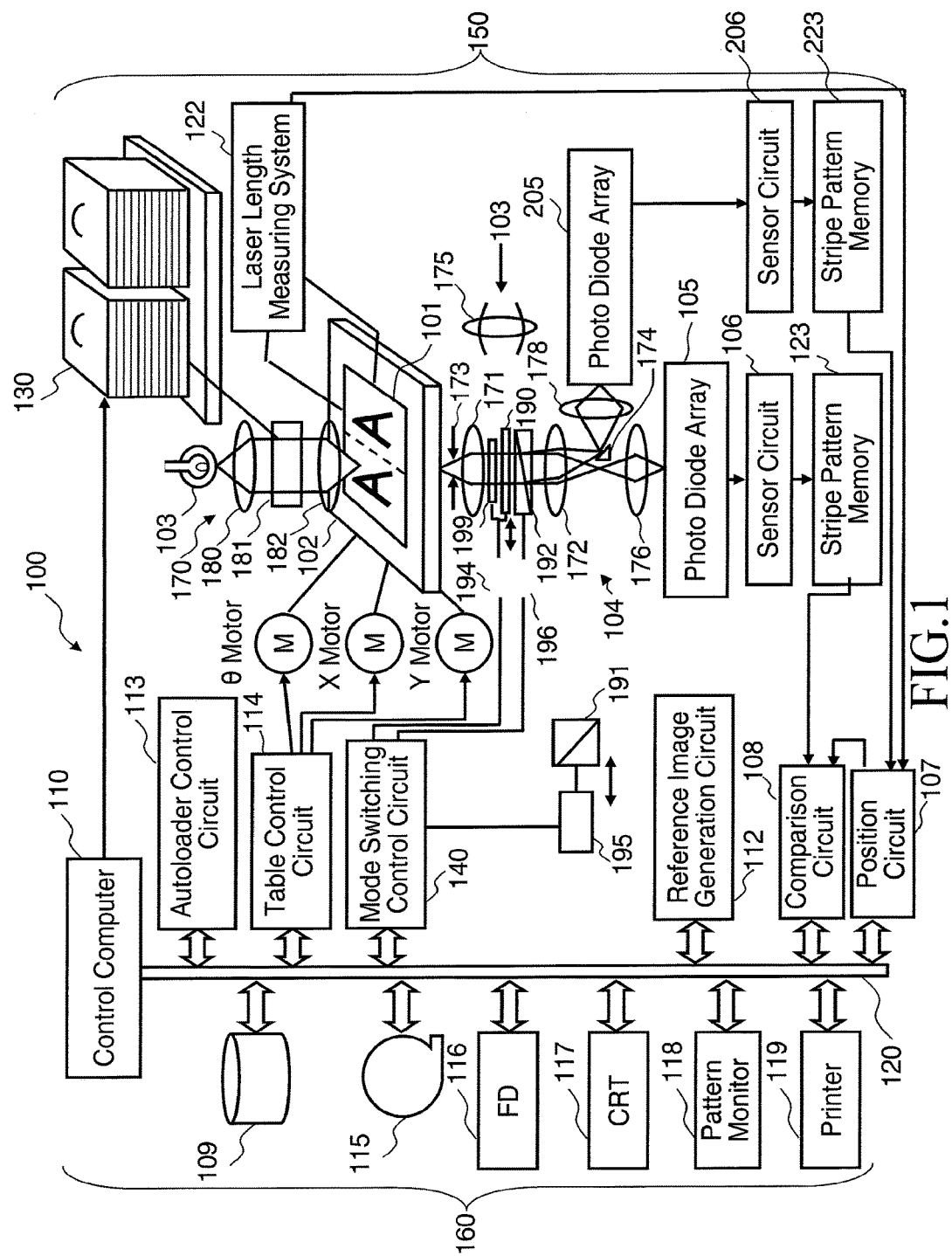
FIG. 1 illustrates a configuration of a pattern inspection apparatus according to a first embodiment.

FIG. 1 illustrates a configuration of a pattern inspection apparatus according to a first embodiment. As shown in FIG.

1, an inspection apparatus 100 that inspects defects of a pattern formed on a mask substrate 101 includes an optical image acquisition mechanism 150 and a control system circuit 160 (control circuit).

The optical image acquisition mechanism 150 (polarized image acquisition device) includes a light source 103, a transmission inspection illumination optical system 170 (transmission illumination optical system), a reflection inspection illumination optical system 175 (reflection illumination optical system), an XYθ table 102 arranged movably, a diaphragm (aperture stop) 173, a magnifying optical system 104, a rotating diaphragm 199, a rotating half-wave plate 190 (λ/2 wave plate), a Rochon prism 192, a mirror 174, a beam splitter 191, transfer mechanisms 194, 195, and 196, two photodiode arrays 105 and 205 (example of a sensor), two sensor circuits 106 and 206, two stripe pattern memories 123 and 223, and a laser length measuring system 122. The mask substrate 101 is placed on the XYθ table 102. The mask substrate 101 is, for example, an exposure photomask used for transfer printing a pattern onto a semiconductor substrate, such as a wafer. A pattern composed of a plurality of figure patterns to be inspected is formed on the photomask. Here, two identical patterns are formed right and left. The mask substrate 101 is arranged, for example, with its pattern forming surface facing downward, on the XYθ table 102.

The transmission inspection illumination optical system 170 includes a projection lens 180, an illumination shape switching mechanism 181, and an image forming lens 182. Moreover, the transmission inspection illumination optical system 170 may also include other lenses, mirrors, and/or optical elements. The reflection inspection illumination optical system 175 includes at least one lens which illuminates a target with a reflection inspection illumination light separated from a transmission inspection illumination light emitted from the light source 103. The reflection inspection illumination optical system 175 may also include other lenses, mirrors, and/or optical elements.

The magnifying optical system 104 includes an objective lens 171, and image forming lenses 172, 176, and 178. Each of the objective lens 171, and the image forming lenses 172, 176, and 178 is composed of at least one lens. Moreover, other lenses and/or mirrors may be provided between the objective lens 171 and the image forming lens 172, between the image forming lens 172 and the image forming lens 176, and/or between the image forming lens 172 and the image forming lens 178.

In the control system circuit 160, a control computer 110 which controls the whole of the inspection apparatus 100 is connected, through a bus 120, to a position circuit 107, a comparison circuit 108, a reference image generation circuit 112, an autoloader control circuit 113, a table control circuit 114, a mode switching control circuit 140, a magnetic disk device 109, a magnetic tape device 115, a flexible disk device (FD) 116, a CRT 117, a pattern monitor 118, and a printer 119. The sensor circuit 106 is connected to the stripe pattern memory 123 which is connected to the comparison circuit 108. Similarly, the sensor circuit 206 is connected to the stripe pattern memory 223 which is connected to the comparison circuit 108. The XYθ table 102 is driven by the motors of the X-, Y-, and θ-axis.

The transfer mechanism 194 moves the rotating diaphragm 199 and the rotating half-wave plate 190 from the inside to the outside of the optical path, and from the outside to the inside of the optical path, under the control of the mode switching control circuit 140. The transfer mechanism 196 moves the Rochon prism 192 from the inside to the outside of the optical path, and from the outside to the inside of the optical path, under the control of the mode switching control circuit 140. The transfer mechanism 195 moves the beam splitter 191 from the inside to the outside of the optical path, and from the outside to the inside of the optical path, under the control of the mode switching control circuit 140. In the case of FIG. 1, the rotating diaphragm 199 and the rotating half-wave plate 190 are conveyed by the same transfer mechanism 194, but it should be understood that they may be conveyed by separate transfer mechanisms. Similarly, it goes without saying that the rotating diaphragm 199, the rotating half-wave plate 190, and the Rochon prism 192 may be conveyed by the same transfer mechanism.

According to the first embodiment, an inspection (polarized image inspection mode (1)) which acquires a polarized image to be used and an inspection (general inspection mode (2)) which captures a pattern image of high magnification to be inspected are configured in a switchable manner. In the case of the polarized image inspection mode (1), in the inspection apparatus 100, an inspection optical system of high magnification is composed of the light source 103, the transmission inspection illumination optical system 170, the XYθ table 102, the diaphragm 173, the magnifying optical system 104, the rotating diaphragm 199, the rotating half-wave plate 190, the Rochon prism 192, the mirror 174, the photodiode arrays 105 and 205, and the sensor circuits 106 and 206. In the case of the general inspection mode (2), in the inspection apparatus 100, an inspection optical system of high magnification is composed of the light source 103, the transmission inspection illumination optical system 170, the reflection inspection illumination optical system 175, the XYθ table 102, the magnifying optical system 104, the beam splitter 191, the mirror 174, the photodiode arrays 105 and 205, and the sensor circuits 106, and 206. For example, an inspection optical system with magnification of 400 to 500 times is configured.

The XYθ table 102 is driven by the table control circuit 114 under the control of the control computer 110. The XYθ table 102 can be moved by a drive system such as a three-axis (X, Y, θ) motor, which drives the table in the directions of X, Y, and θ. For example, a linear motor can be used as each of these X, Y, and θ motors. The XYθ table 102 is movable in the horizontal direction and the rotation direction by the motors of the X-, Y-, and θ-axis. The focus position (optical axis direction: Z-axis direction) of the objective lens 171 is dynamically adjusted to be on the pattern forming surface of the mask substrate 101 by an automatic focus (AF) control circuit (not shown) under the control of the control computer 110. For example, the focus position of the objective lens 171 is adjusted by being moved in the optical axis direction (Z-axis direction) by a piezoelectric element (not shown). Alternatively, it is also preferable that the focus position of the objective lens 171 is adjusted to be on the pattern forming surface of the mask substrate 101 by making the position of the objective lens 171 fixed and making the XYθ table 102 dynamically move in the optical axis direction (Z-axis direction) by an automatic focus (AF) control circuit (not shown). The movement position of the mask substrate 101 placed on the XYθ table 102 is measured by the laser length measuring system 122, and supplied to the position circuit 107.

Design pattern data (writing data) used as the basis of pattern formation of the mask substrate 101 is input from outside the inspection apparatus 100 into the magnetic disk drive 109 to be stored therein.

FIG. 1 shows configuration elements necessary for describing the first embodiment. It should be understood that other configuration elements generally necessary for the inspection apparatus 100 may also be included therein.

Figure 2A:
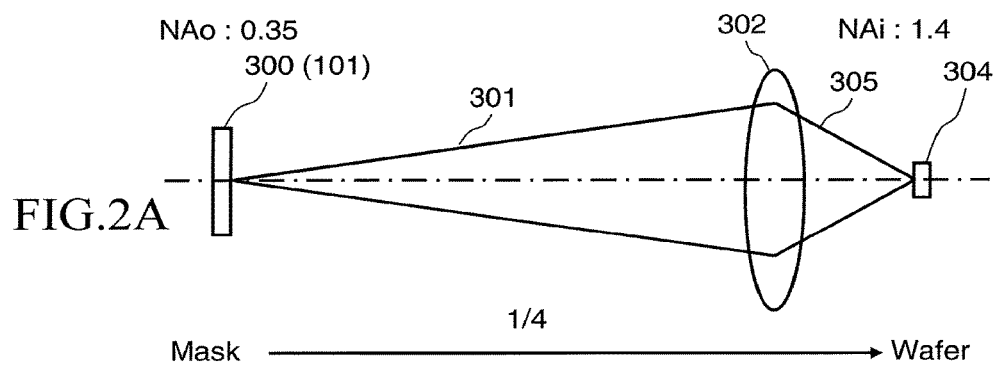
FIGS. 2A and 2B show comparison between the numerical aperture of the inspection apparatus and the numerical aperture of the exposure apparatus according to the first embodiment.
Figure 2B:
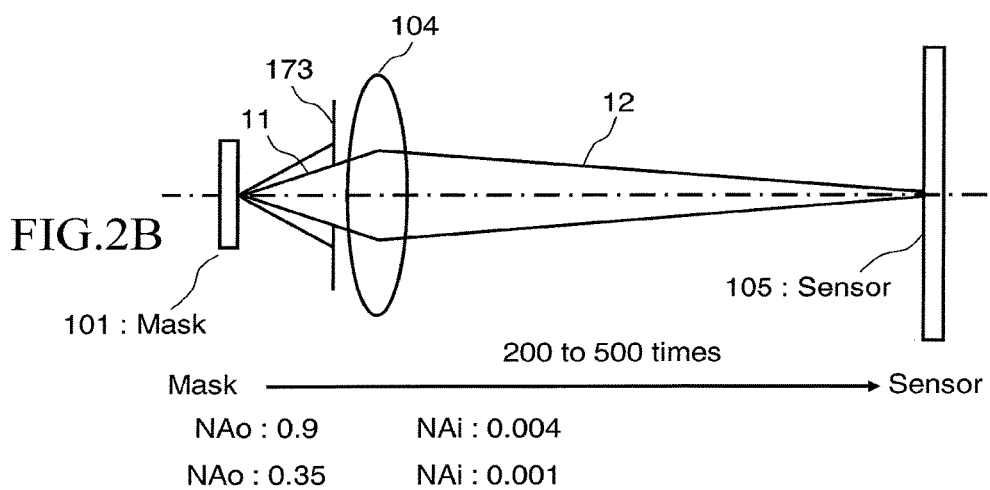

FIGS. 2A and 2B show comparison between the numerical aperture of the inspection apparatus and the numerical aperture of the exposure apparatus according to the first embodiment. FIG. 2A shows a part of the optical system of the exposure apparatus such as a stepper which exposes (transfers) a pattern formed on a mask substrate 300 to a semiconductor substrate. In the exposure apparatus, the mask substrate 300 is illuminated with an illumination light (not shown), a transmitted light 301 from the mask substrate 300 enters an objective lens 302, and a light 305 having passed through the objective lens 302 forms an image on a semiconductor substrate 304 (wafer: substrate to be exposed, exposure substrate)). Although FIG. 2A shows the objective lens 302 (reduction optical system) composed of only one lens, it is, of course, also preferable to combine a plurality of lenses to configure the objective lens 302. In the currently-used exposure apparatus, a pattern formed on the mask substrate 300 is reduced to, for example, ¼ to be exposed and transferred to the semiconductor substrate 304. In this regard, the numerical aperture NAi (image "i" side numerical aperture) with respect to the semiconductor substrate 304 of the exposure apparatus is set to, for example, NAi=1.4. In other words, the numerical aperture NAi (image "i" side numerical aperture) of the objective lens 302, which can pass through the objective lens 302, is set, for example, to NAi=1.4. Since a transmitted light image from the mask substrate 300 is reduced to ¼ in the exposure apparatus, the sensitivity of the objective lens 302 with respect to the mask substrate 300 becomes ¼. In other words, the numerical aperture NAo (object "o" side numerical aperture) of the objective lens 302, with which a transmitted light from the mask substrate 300 can enter the objective lens 302, is ¼ of NAi, namely, NAo=0.35. Accordingly, it indicates that a transmitted light image of a light flux of numerical aperture NAo=0.35 from the mask substrate 300 is exposed and transferred, as an image of a light flux of very large numerical aperture NAi=1.4, to the semiconductor substrate 304 in the exposure apparatus.

On the other hand, in the inspection apparatus 100 according to the first embodiment, whose part is shown in FIG. 2B, the mask substrate 101 is illuminated with an illumination light (not shown), a transmitted light 11 from the mask substrate 101 enters the magnifying optical system 104 including an objective lens, and a light 12 having passed through the magnifying optical system 104 forms an image on the photodiode array 105 (image sensor). In that case, the numerical aperture NAo (object "o" side numerical aperture) of the objective lens, with which the transmitted light 11 from the mask substrate 101 can enter the magnifying optical system 104, is set to NAo=0.9, for example. Since, in the inspection apparatus 100, a transmitted light image from the mask substrate 300 is magnified 200 to 500 times to be compared in the inspection, the sensitivity of the magnifying optical system 104 with respect to the mask substrate 101 is 200 to 500. Therefore, the numerical aperture NAi (image "i" side numerical aperture) of the magnifying optical system 104 with respect to the photodiode array 105 is 1/500 to 1/200 of NAo, that is, the numerical aperture NAi=0.004, for example.

Thus, the information amount of light obtained by the objective lens 302 with NAo=0.35 of the exposure apparatus originally differs from the information amount of light obtained by the objective lens 302 with NAo=0.9 of the inspection apparatus 100. Therefore, it is difficult for the image on the semiconductor substrate 304 and the image on the light receiving surface of the photodiode array 105 to be the same image because their numbers of light fluxes are different. Then, in order to make the objective lens of the inspection apparatus 100 equal to the objective lens 302 of the exposure apparatus, NAo of the objective lens of the inspection apparatus 100 is set to, for example, NAo=0.35 by stopping down the light flux with the diaphragm 173. Thereby, the numbers of the light fluxes can be equal to each other. However, in the inspection apparatus 100, since the transmitted light image from the mask substrate 300 has been magnified 200 to 500 times in order to be compared in the inspection, the sensitivity of the magnifying optical system 104 with respect to the mask substrate 101 is 200 to 500. Therefore, the numerical aperture NAi (image "i" side numerical aperture) of the magnifying optical system 104 with respect to the photodiode array 105 becomes 1/500 to 1/200 of NAo, for example, that is NAi=0.001, while not becoming a very large numerical aperture NAi=1.4 such as the objective lens 302 of the exposure apparatus. Thus, the numerical aperture NAi (image "i" side numerical aperture) of the magnifying optical system 104 with respect to the photodiode array 105 becomes sufficiently smaller than that of the objective lens 302 (reduction optical system) of the exposure apparatus. Although FIG. 2B shows only the magnifying optical system 104, a plurality of lenses are arranged in the magnifying optical system 104. As described above, the magnifying optical system 104 includes at least the objective lens 171, and the image forming lenses 172 and 176 (and image forming lens 178).

The transmitted light 190 which is an illumination light focused on the mask substrate 101 and passed through the mask substrate 101 enters the objective lens 171 with the same numerical aperture NAo (NAo=0.35) as that in the case when the mask substrate 101 is arranged in the exposure apparatus, the objective lens 302 of the exposure apparatus, which is for receiving a transmitted light from the mask substrate 101 and forming an image on the semiconductor substrate 304, receives the transmitted light 301 from the mask substrate 101. The image forming lens 176 (and image forming lens 178) makes the beam having passed through the inside of the magnifying optical system 104 be focused with the numerical aperture NAi (NAi=0.001) sufficiently smaller than that of the objective lens 302 of the exposure apparatus.

Figures 3, 4:
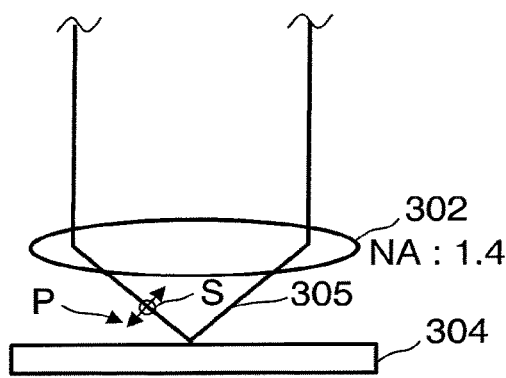
FIG. 3 illustrates features of the S-polarized wave and the P-polarized wave in a comparative example with respect to the first embodiment.
FIG. 4 shows comparison between relations among an image side numerical aperture, an S-polarized wave, and a P-polarized wave in the first embodiment and a comparative example.

FIG. 3 illustrates features of the S-polarized wave and the P-polarized wave in a comparative example with respect to the first embodiment. FIG. 3 illustrates an example of a state in which the light 305 having passed through the objective lens 302 of the exposure apparatus being a comparative example is formed (focused) on the semiconductor substrate 304. Since the numerical aperture NAi (image "i" side numerical aperture) of the objective lens 302 with respect to the semiconductor substrate 304 is a very large numerical aperture NAi=1.4, the amplitude of especially the P-polarized component of the light 305 is reduced, removed, or inverted due to the effect of light interference.

FIG. 4 shows comparison between relations among an image side numerical aperture, an S-polarized wave, and a P-polarized wave in the first embodiment and a comparative example. In the exposure apparatus, as described above, since the numerical aperture NAi of the objective lens 302 at the side of the semiconductor substrate 304 is a very large NAi=1.4, the amplitude of the P-polarized component is reduced, removed, or inverted as shown in FIG. 4. By contrast, the amplitude of the S-polarized component maintains the same state regardless of the numerical aperture NAi of the objective lens 302 at the side of the semiconductor substrate 304.

On the other hand, in the inspection apparatus 100, as described above, since the numerical aperture NAi of the magnifying optical system 104 at the side of the photodiode array 105 is a very (sufficiently) small NAi=0.001 compared with that of the objective lens 302 of the exposure apparatus, the amplitude of the P-polarized component is not reduced, removed, or inverted. The amplitude of the S-polarized component similarly maintains the same state.

Since both the light of a mask pattern image formed (focused) on the semiconductor substrate 304 in the exposure apparatus, and the light of a mask pattern image formed (focused) on the photodiode array 105 in the inspection apparatus 100 are combined lights each composed of the P-polarized component and an S-polarized component, if P-polarized components of the light of the mask pattern images are different, optical images obtained are not the same.

Then, in light of this phenomenon, according to the first embodiment, the mask pattern image focused and formed on the photodiode array 105 is separated into an image of the P-polarized component and an image of the S-polarized component and acquired in the inspection apparatus 100. Thereby, by adjusting a combining method (rate), etc. of the P-polarized component and the S-polarized component, it becomes possible to generate an exposure image from the two types of images captured by the photodiode array 105. Furthermore, according to the first embodiment, instead of acquiring each of an image of the P-polarized component and an image of the S-polarized component one by one, a plurality of images of the P-polarized component and a plurality of images of the S-polarized component at the same position are individually acquired, thereby increasing the degree of freedom at the combining time.

Figure 5:
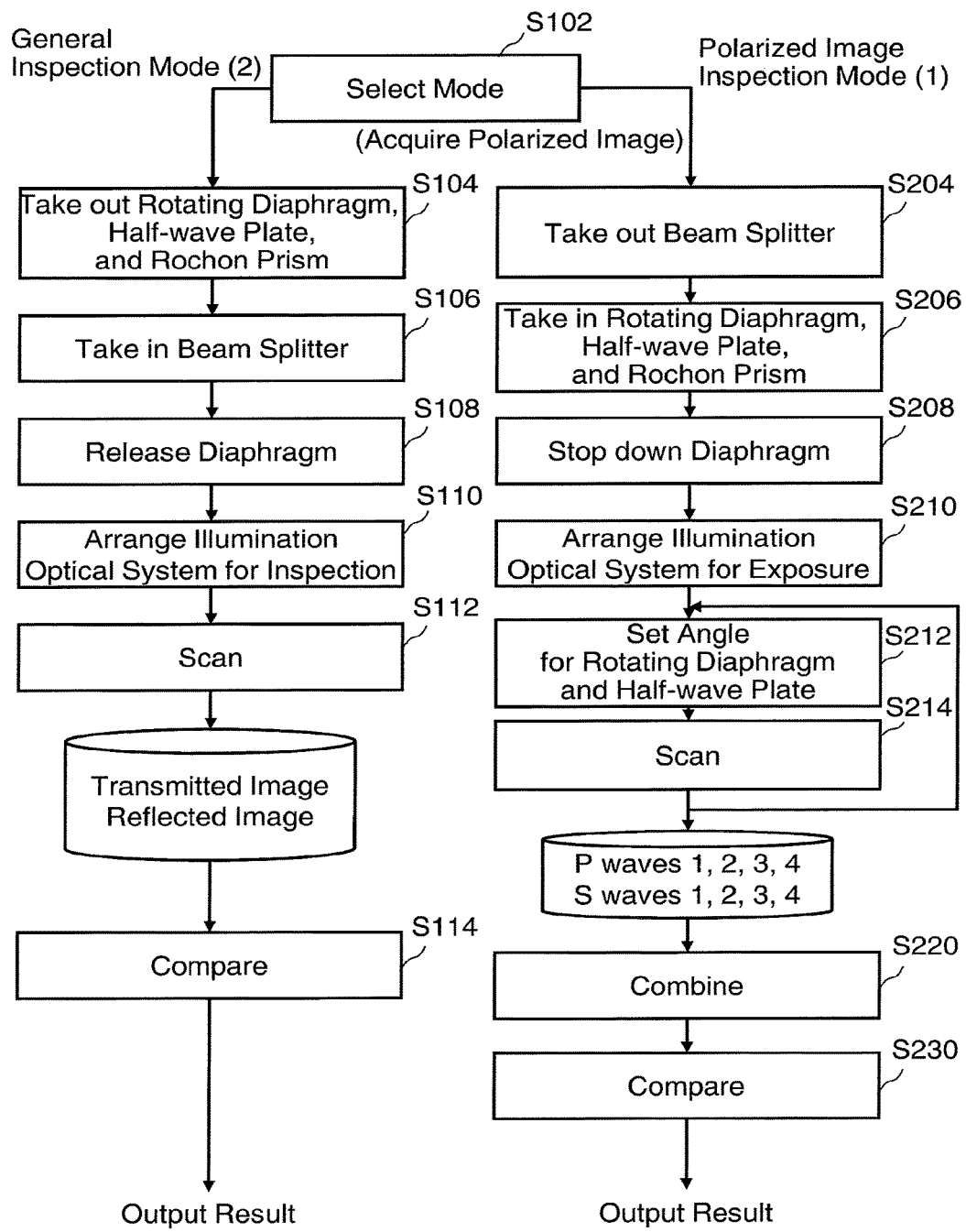
FIG. 5 is a flowchart showing main steps of a pattern inspection method according to the first embodiment.

FIG. 5 is a flowchart showing main steps of a pattern inspection method according to the first embodiment. In FIG. 5, the pattern inspection method of the first embodiment executes each step of a mode selection step (S102), a taking-out step (S104), a taking-in step (S106), a diaphragm release step (S108), an illumination optical system switching step (S110), a scanning step (S112), a comparison step (S114), a taking-out step (S204), a taking-in step (S206), a diaphragm stopping-down step (S208), an illumination optical system switching step (S210), an angle setting step (S212) for rotating diaphragm and half-wave plate, a scanning step (S214), a combining step (S220), and a comparison step (S230).

In the mode selection step (S102), in the case of selecting a polarized image inspection mode (1) in which a polarized image is acquired to be used, each of the steps in FIG. 5 of the taking-out step (S204), the taking-in step (S206), the diaphragm stopping-down step (S208), the illumination optical system switching step (S210), the angle setting step (S212) for rotating diaphragm and half-wave plate, the scanning step (S214), the combining step (S220), and the comparison step (S230) is executed in the polarized image inspection mode (1).

In the mode selection step (S102), in the case of selecting a general inspection mode (2) in which a pattern image of high magnification is captured to be inspected, each of the steps in FIG. 5 of the taking-out step (S104), the taking-in step (S106), the diaphragm release step (S108), the illumination optical system switching step (S110), the scanning step (S112), and the comparison step (S114) is executed in the general inspection mode (2).

Therefore, first, in the mode selection step (S102), one of the polarized image inspection mode (1) and the general inspection mode (2) is selected by a user. For example, the user may select one of the inspection modes (1) and (2) through a keyboard, a mouse, a touch panel, or the like (not shown). Information on the selected inspection mode is output to the mode switching control circuit 140 under the control of the control computer 110. Based on the information on the input inspection mode, the mode switching control circuit 140 switches adjustment, etc. of the inspection optical system. First, the case of selecting the polarized image inspection mode (1) will be described.

Figure 6:
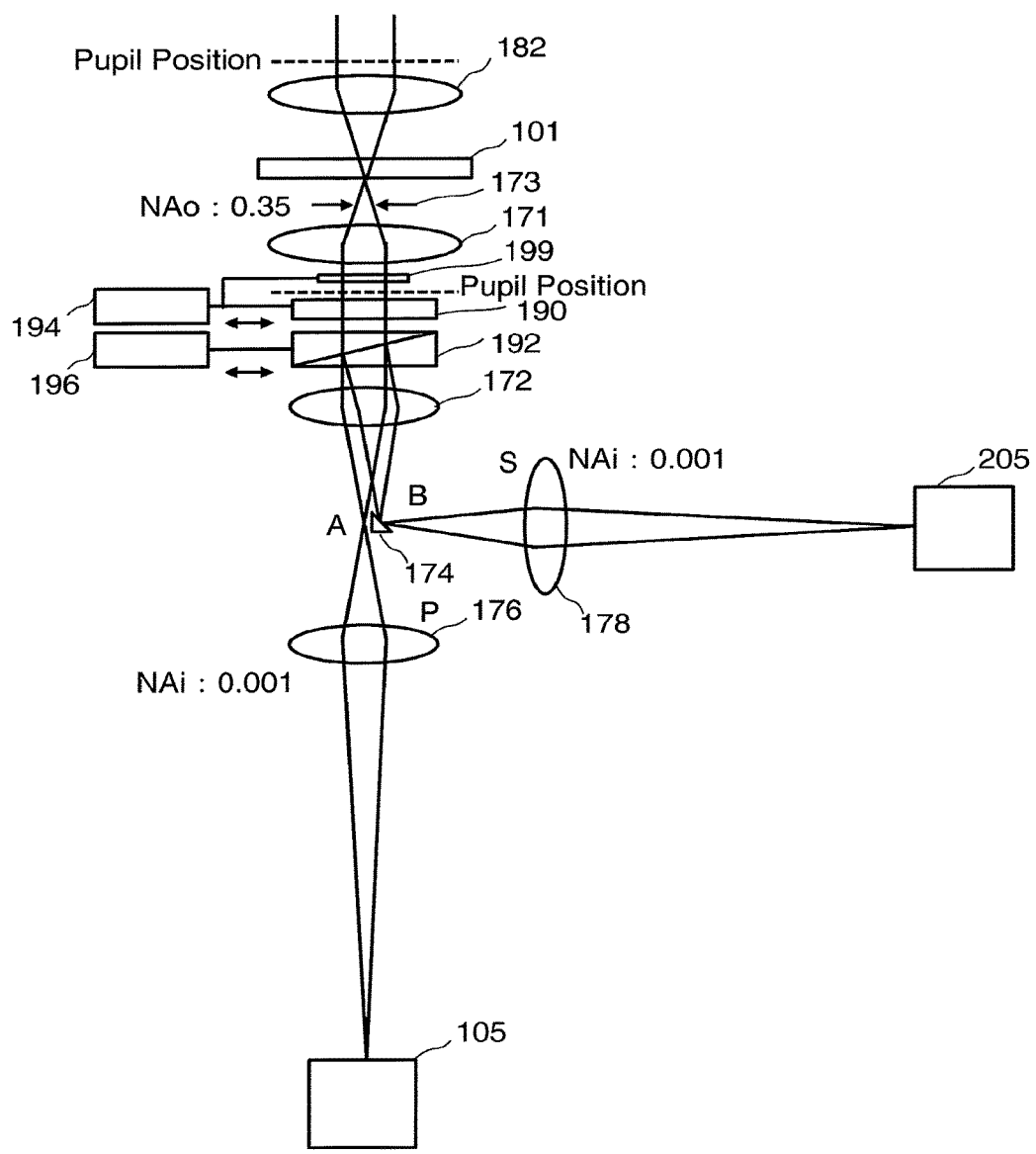
FIG. 6 shows an example of the configuration of the inspection optical system in the polarized image inspection mode according to the first embodiment.

FIG. 6 shows an example of the configuration of the inspection optical system in the polarized image inspection mode according to the first embodiment. FIG. 6 shows a part of the configuration of FIG. 1. In FIG. 6, the dotted line indicates a pupil position from each lens. Reduction scales, etc. of positions of respective configuration elements in FIGS. 1 and 6 are not coincident with each other.

In the taking-out step (S204), the transfer mechanism 195 moves the beam splitter 191 from the inside to the outside of the optical path, under the control of the mode switching control circuit 140. If the beam splitter 191 is arranged outside the optical path from the first, this operation is to be omitted.

In the taking-in step (S206), the transfer mechanism 194 moves the rotating diaphragm 199 and the rotating half-wave plate 190 from the outside to the inside of the optical path, under the control of the mode switching control circuit 140. The rotating diaphragm 199 and the rotating half-wave plate 190 are positioned opposite to the mask substrate 101 with respect to the objective lens 171. Particularly, the rotating half-wave plate 190 is arranged close to the pupil position of the objective lens 171.

The transfer mechanism 196 moves the Rochon prism 192 from the outside to the inside of the optical path, under the control of the mode switching control circuit 140. Specifically, the Rochon prism 192 is placed close to the space region in the optical path which is made by taking out the beam splitter 191 from the inside to the outside of the optical path.

In the diaphragm stopping-down step (S208), the mode switching control circuit 140 makes NAo of the objective lens 171 equal to that of the objective lens 302 of the exposure apparatus by narrowing the diameter of the aperture of the diaphragm 173 in order to reduce the number of the light fluxes which can pass therethrough. For example, NAo of the objective lens of the inspection apparatus 100 is set to NAo=0.35.

In the illumination optical system switching step (S210), the illumination shape switching mechanism 181 switches optical elements including a lens, a mirror, etc. so that the shape of an illumination light (inspection light) for transmission inspection may be the same as that used in the exposure apparatus. Such optical elements should be arranged in a switchable manner to be in accordance with illumination conditions of the exposure apparatus.

In the angle setting step (S212) for rotating diaphragm and half-wave plate, the mode switching control circuit 140 sets the angle of the passage region of the rotating diaphragm 199. Moreover, the mode switching control circuit 140 sets the angle of the rotating half-wave plate 190.

Figure 7A:
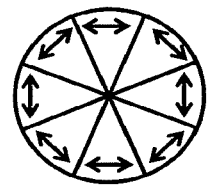
FIGS. 7A and 7B show examples of a polarization component state according to the first embodiment.
Figure 7B:
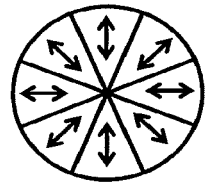

FIGS. 7A and 7B show examples of a polarization component state according to the first embodiment. As shown in FIG. 7A, in the first embodiment, the polarized component whose polarization direction is in a tangential direction of a circumference centering on the optical axis of a transmitted light is defined as an S-polarized component. As shown in FIG. 7B, the polarized component whose polarization direction is in a radial direction (radiation direction) of a circle centering on the optical axis of a transmitted light is defined as a P-polarized component. In other words, the P-polarized component and the S-polarized component intersect perpendicularly at any position in the circle of a transmitted light in the plane orthogonal to the traveling direction of the transmitted light.

FIGS. 8A to 8D show angles of a rotating diaphragm, a P-polarized component and an S-polarized component, and a P-polarized component and an S-polarized component after passing the rotating half-wave plate according to the first embodiment. As shown in FIGS. 8A to 8D, the rotating diaphragm 199 is rotational symmetrically divided into 4n equal regions in the plane orthogonal to the traveling direction. Two regions 40a and 40b opposite to each other with respect to the central axis are passage regions of light. In the examples of FIGS. 8A to 8D, the circle is equally divided into eight regions, where the two regions 40a and 40b opposite to each other with respect to the central axis are light passage regions (openings). In the examples of FIGS. 8A to 8D, the angle of the rotating diaphragm 199 is set to be four angles of 0°, 45°, 90°, and 135°. Thereby, when the passage region of the light having passed through the objective lens 171 is narrowed (restricted) to the two regions 40a and 40b opposite to each other with respect to the central axis, each two (regions 40a and 40b) of the eight regions (4n regions) of the rotating diaphragm 199 become passage regions in order. The following scanning step (S214) is carried out for each angle of the rotating diaphragm 199. The angle of the passage region of the rotating diaphragm 199 is defined by the central line of the passage region which passes through the central axis.

In the scanning step (S214), the optical image acquisition mechanism 150 acquires an optical image of a pattern formed on the mask substrate 101. Specifically, it operates as described below.

In FIG. 6, there is generated a laser light (e.g., DUV light) being an inspection light from the light source 103, whose wavelength is equal to or shorter than that of the ultraviolet region. The generated light illuminates the illumination shape switching mechanism 181 by the projection lens 180, where the shape of the illumination light (inspection light) is changed by the illumination shape switching mechanism 181 to be the same as that used in the exposure apparatus. The illumination light (first illumination light) whose illumination shape is the same as that used in the exposure apparatus is focused and formed, by the image forming lens 182, on the pattern forming surface of the mask substrate 101, from the back side opposite to the pattern forming surface of the mask substrate 101. The numerical aperture of the transmitted light (mask pattern image) having passed through the mask substrate 101 is reduced by the diaphragm 173 to be NAo (NAo=0.35) which is the same numerical aperture as that of the objective lens 302 (reduction optical system) of the exposure apparatus when receiving a transmitted light from the mask substrate 101. Then, the transmitted light enters the objective lens 171 and is projected in parallel onto the rotating diaphragm 199 by the objective lens 171. Therefore, the optical conditions of the inspection apparatus 100 up to this stage can be the same as those of the exposure apparatus.

Next, the rotating diaphragm 199 narrows (restricts) the passage region of the light having passed through the objective lens 171 to the two regions 40a and 40b opposite to each other with respect to the central axis of the rotating diaphragm 199. Here, the angle of the passage region is set to 0°, for example. Thereby, one fourth of the light having passed through the objective lens 171 can pass the passage region.

With respect to each angle of the passage region of the rotating diaphragm 199, the rotating half-wave plate 190 converts the P-polarized component having passed through the rotating diaphragm 199 and being in the same direction as the angle of the passage region of the rotating diaphragm 199 and the S-polarized component having passed through the rotating diaphragm 199 and being in the direction orthogonal to the angle of the passage region into a polarized wave of 0° (first direction) and a polarized wave of 90° (second direction), where the polarized waves have been set previously and are orthogonal to each other.

Figure 8A:
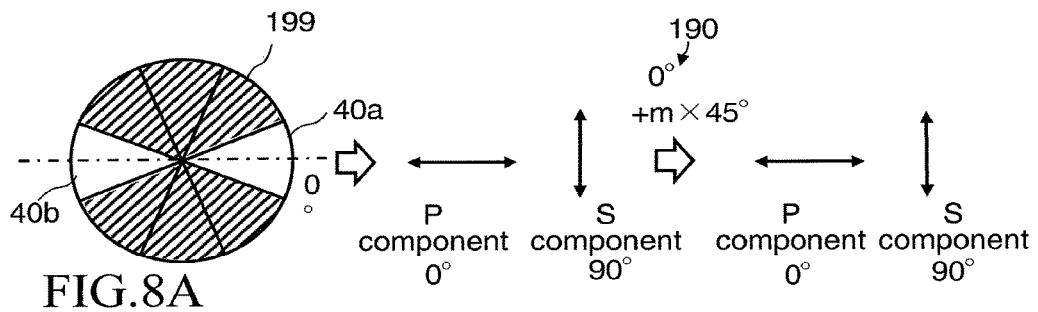
FIGS. 8A to 8D show angles of a rotating diaphragm, a P-polarized component and an S-polarized component, and a P-polarized component and an S-polarized component after passing the rotating half-wave plate according to the first embodiment.

The example of FIG. 8A shows the case where the passage region configured by the two regions 40a and 40b of the rotating diaphragm 199 is set to 0° position with respect to the x axis in the plane (x and y planes) orthogonal to the traveling direction (z direction). Therefore, the P-polarized component of the light (1/(2n) of the entire passing light) which passes through the rotating diaphragm 199 in the state where the passage region is 0° turns into a polarized component of 0° in the same direction as the angle of the passage region, and the S-polarized component of that turns into a polarized component of 90° orthogonal to the angle of the passage region. In that case, the optic axis of the rotating half-wave plate 190 is set to an angle which is calculated by adding m (m being an integer) times 45° to 0°. Thereby, the P-polarized component and the S-polarized component which have passed through the rotating half-wave plate 190 can be converted into a polarized wave of 0° (polarized wave in the first direction) and a polarized wave of 90° (polarized wave in the second direction). In the example of FIG. 8A, the P-polarized component becomes a polarized wave of 0° (polarized wave in the first direction), and the S-polarized component becomes a polarized wave of 90° (polarized wave in the second direction).

Figure 9:
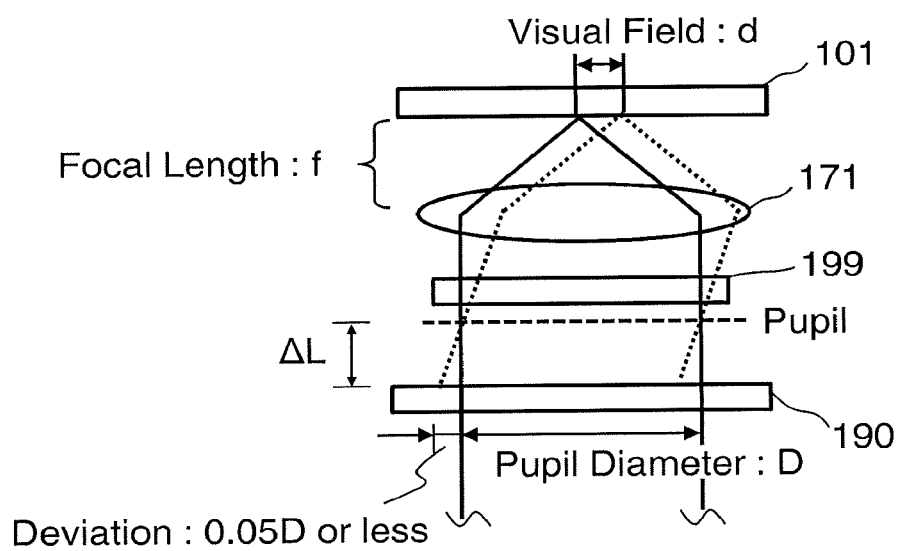
FIG. 9 illustrates an arrangement position of a rotating half-wave plate according to the first embodiment.

FIG. 9 illustrates an arrangement position of a rotating half-wave plate according to the first embodiment. The rotating half-wave plate 190 is positioned opposite to the mask substrate 101 with respect to the objective lens 171, and close to the pupil position of the objective lens 171. The spread of the beam at the position of the rotating half-wave plate 190 is preferably 5% or less of the pupil diameter D (maximum diameter of axial (on-axis) parallel light fluxes having passed through the objective lens 171) of the objective lens 171. Therefore, a deviation amount ΔL from the pupil position of the objective lens 171 in the arranged position of the rotating half-wave plate 190 preferably satisfies the following equation (1) using a pupil diameter D of the objective lens 171, a visual field diameter d of the objective lens 171, and a focal length f of the objective lens 171.

$$\Delta L < 0.05 \cdot D \cdot f/d \quad (1)$$

Therefore, the rotating half-wave plate 190 is preferably arranged within the deviation amount ΔL of the pupil position of the objective lens 171.

A transmitted light having passed through the rotating half-wave plate 190 enters the Rochon prism 192. The Rochon prism 192 separates between the trajectory of the polarized wave of 0° (polarized wave in the first direction) and the trajectory of the polarized wave of 90° (polarized wave in the second direction) of the transmitted light. In the case of FIG. 6, the polarized wave of 0° (polarized wave in the first direction) of the transmitted light passes as it is, and the trajectory of the polarized wave of 90° (polarized wave in the second direction) is bent to pass. The relationship between the polarized component which passes without changing the trajectory and the polarized component which passes after changing the trajectory may be reversed. Since the direction of the polarized wave has been changed to 0° or 90° by the rotating half-wave plate 190, the Rochon prism 192 can separate between the polarized wave of 0° (polarized wave in the first direction) and the polarized wave of 90° (polarized wave in the second direction).

Both the polarized wave of 0° (polarized wave in the first direction) and the polarized wave of 90° (polarized wave in the second direction) which have passed through the Rochon prism 192 enter the image forming lens 172. According to the first embodiment, since the direction of the trajectory of one of the polarized wave of 0° (polarized wave in the first direction) and the polarized wave of 90° (polarized wave in the second direction) has been changed by the Rochon prism 192, (here, for example, the changed one is the polarized wave of 90°), the incident position to the image forming lens 172 of the polarized wave of 0° and that of the polarized wave of 90° are different from each other. Therefore, the image forming lens 172 focuses and forms the polarized wave of 0° and the polarized wave of 90° which have passed through the Rochon prism 192 at different image formation positions. In the case of FIG. 6, the image forming lens 172 focuses and forms the polarized wave of 0° at the image formation position A, and the polarized wave of 90° at the image formation position B.

The mirror 174 is arranged at the image formation position A or the image formation position B. In the case of FIG. 6, the mirror 174 is arranged such that a reflective surface is located at the image formation position B. Then, in the state where one of the polarized wave of 0° and the polarized wave of 90° is focused and formed at its corresponding image formation position, the mirror 174 reflects the other one of them at the other one's corresponding image formation position. In the case of FIG. 6, the mirror 174 reflects the polarized wave of 90° at the image formation position B of the polarized wave of 90° which is different from the image formation position A of the polarized wave of 0°.

With respect to one of the polarized wave of 0° and the polarized wave of 90° (in the case of FIG. 6, the polarized wave of 0°) for which the mirror 174 is not placed on its optical path, after it is once focused and formed at the image formation position A, it goes straight to enter the image forming lens 176. The image forming lens 176 (first image forming lens) focuses an incident light to form an image on the photodiode array 105, with a numerical aperture (NAi=0.001) sufficiently smaller than that (NAi=1.4) of the objective lens 302 (reduction optical system) of the exposure apparatus.

The photodiode array 105 (first image sensor) captures an image of one of the polarized wave of 0° and the polarized wave of 90° (for example, in the case of FIG. 6, an image of the polarized wave of 0°) which is focused and formed by the image forming lens 176.

With respect to the other one of the polarized wave of 0° and the polarized wave of 90° (in the case of FIG. 6, the polarized wave of 90°) for which the mirror 174 is placed on its optical path, after it is once focused and formed at the image formation position B, it is reflected by the mirror 174 so as to enter the image forming lens 178. The image forming lens 178 (second image forming lens) focuses an incident light to form an image on the photodiode array 205, with a numerical aperture (NAi=0.001) sufficiently smaller than that (NAi=1.4) of the objective lens 302 (reduction optical system) of the exposure apparatus.

The photodiode array 205 (second image sensor) captures an image of the other one of the polarized wave of 0° and the polarized wave of 90° (for example, in the case of FIG. 6, an image of the polarized wave of 90°) which is focused and formed by the image forming lens 178.

It is preferable to use, for example, a TDI (time delay integration) sensor, etc. as the photodiode arrays 105 and 205. The photodiode array 105 or 205 (image sensor) captures an optical image of a corresponding polarized component of a pattern formed on the mask substrate 101 in the state where the XYθ table 102 with the mask substrate 101 placed thereon is moving.

Figure 10:
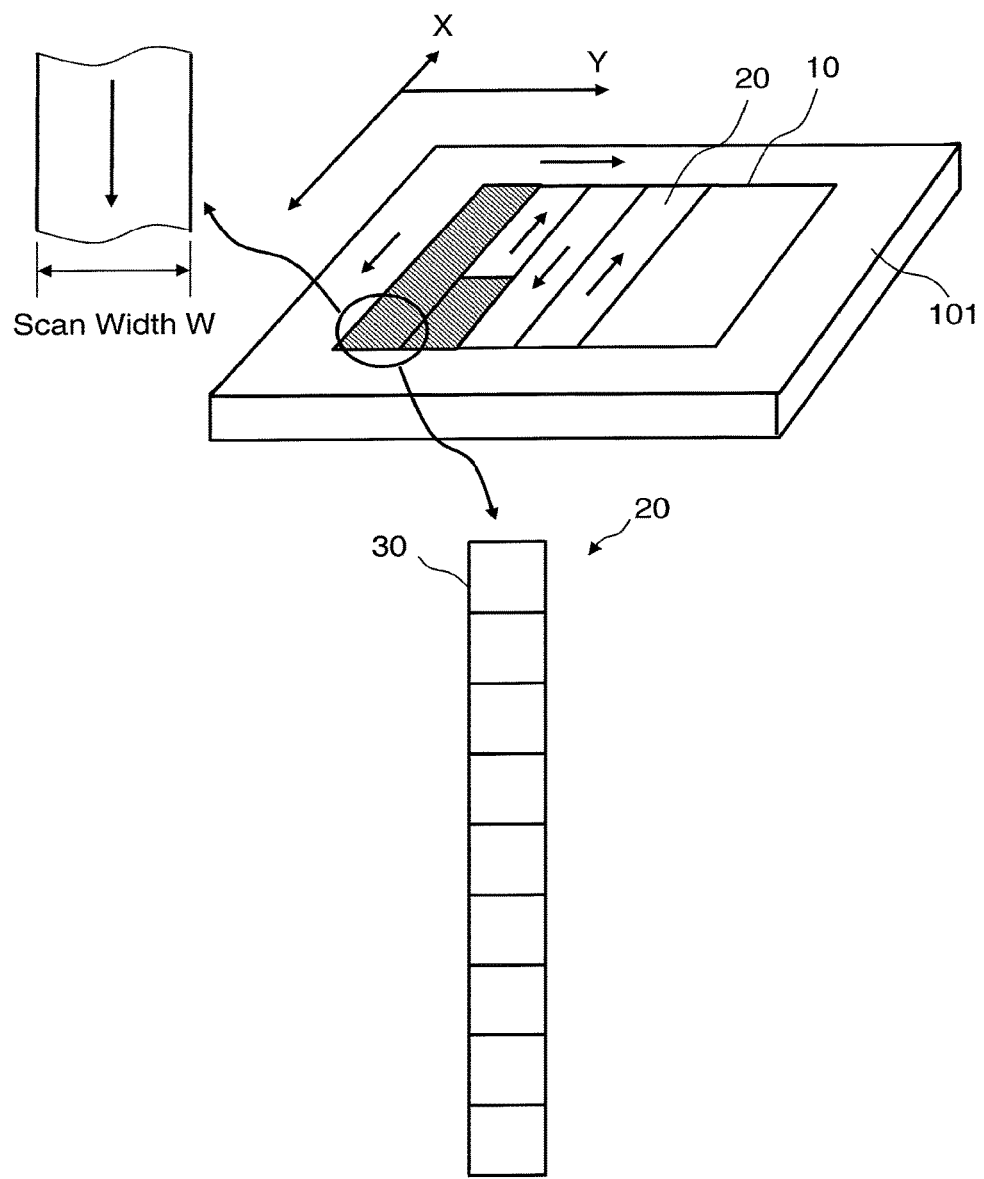
FIG. 10 is a conceptual diagram illustrating an inspection region according to the first embodiment.

FIG. 10 is a conceptual diagram illustrating an inspection region according to the first embodiment. As shown in FIG. 10, an inspection region 10 (entire inspection region) of the mask substrate 101 is virtually divided into a plurality of strip-shaped inspection stripes 20 each having a scan width W in the y direction, for example. The inspection apparatus 100 acquires an image (stripe region image) from each inspection stripe 20. That is, with respect to each of the inspection stripes 20, the inspection apparatus 100 captures an image of a figure pattern arranged in the stripe region concerned while advancing in the longitudinal direction (x direction) of the stripe region concerned by using a laser light. Then, the mask substrate 101 is moved in the x direction by the movement of the XYθ table 120, and accordingly, the photodiode arrays 105 and 205, which continuously move relatively in the −x direction, acquire optical images. The photodiode arrays 105 and 205 continuously capture optical images each having a scan width W as shown in FIG. 10. In other words, while moving relatively to the XYθ table 102, the photodiode arrays 105 and 205, each being an example of a sensor, capture optical images of patterns formed on the mask substrate 101, by using an inspection light. According to the first embodiment, after capturing an optical image in one inspection stripe 20, the photodiode arrays 105 and 205 move in the y direction to the position of the next inspection stripe 20 and similarly, continuously capture another optical image having a scan width W while moving in the direction reverse to the last image capturing direction. Thereby, the image capturing is repeated in the forward (FWD) and backward (BWD) directions, namely changing the direction reversely when advancing and returning.

The direction of the image capturing is not limited to repeating the forward (FWD) and backward (BWD) movement. Images may be captured in a fixed one direction. For example, it is sufficient to repeat FWD and FWD, or alternatively, to repeat BWD and BWD.

The pattern image of the polarized wave of 0° formed on the photodiode array 105 is photoelectrically converted by each light receiving element of the photodiode array 105, and further analog-to-digital (A/D) converted by the sensor circuit 106. Then, pixel data of the inspection stripe 20 to be measured is stored in the stripe pattern memory 123. When capturing an image of the pixel data (stripe region image), it is preferable to use, as the dynamic range of the photodiode array 105, a dynamic range where 60% incidence case of the illumination light amount is the maximum gray level, for example.

On the other hand, the pattern image of the polarized wave of 90° formed on the photodiode array 205 is photoelectrically converted by each light receiving element of the photodiode array 205, and further analog-to-digital (A/D) converted by the sensor circuit 206. Then, pixel data for the inspection stripe 20 to be measured is stored in the stripe pattern memory 223. When capturing an image of pixel data (stripe region image), it is preferable to use, as the dynamic range of the photodiode array 205, a dynamic range where 60% incidence case of the illumination light amount is the maximum gray level, for example.

When acquiring an optical image of the inspection stripe 20, the laser length measuring system 122 measures the position of the XYθ table 102. The measured position information is output to the position circuit 107. The position circuit 107 (calculation unit) calculates the position of the mask substrate 101 by using the measured position information.

Then, the stripe region image of the polarized wave of 0° is sent to the comparison circuit 108, with data indicating the position of the mask substrate 101 on the XYθ table 102 output from the position circuit 107. Measured data (pixel data) of the polarized wave of 0° is, for example, 8-bit unsigned data, and indicates gradation of brightness (light intensity) of each pixel. The stripe region image of the polarized wave of 0° output into the comparison circuit 108 is stored in a storage device to be described later.

Similarly, the stripe region image of the polarized wave of 90° is sent to the comparison circuit 108, with data indicating the position of the mask substrate 101 on the XYθ table 102 output from the position circuit 107. Measured data (pixel data) of the polarized wave of 90° is, for example, 8-bit unsigned data, and indicates gradation of brightness (light intensity) of each pixel. The stripe region image of the polarized wave of 90° output into the comparison circuit 108 is stored in a storage device to be described later.

Thus, the scanning operation in the case of the angle of the passage region of the rotating diaphragm 199 being 0° is completed. Next, it returns to the angle setting step (S212) for rotating diaphragm and half-wave plate. Then, the angle of the passage region of the rotating diaphragm 199 and the angle of the optic axis of the half-wave plate are changed, and the scanning step (S214) is carried out similarly.

Figure 8B:
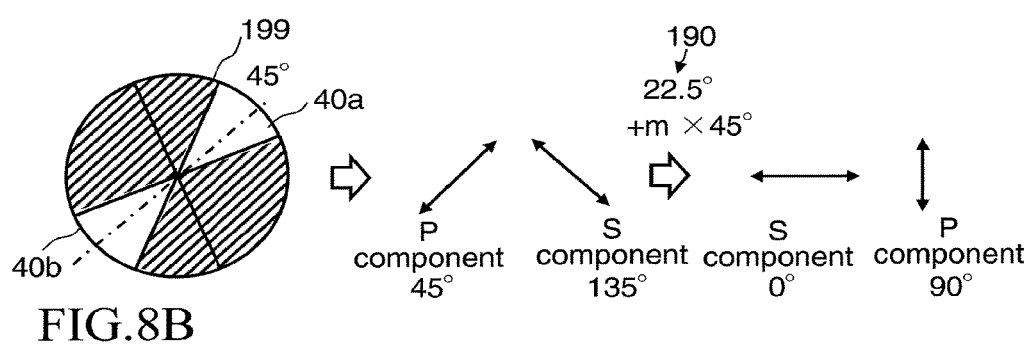

The example of FIG. 8B shows the case where the passage region configured by the two regions 40a and 40b of the rotating diaphragm 199 is set to 45° position with respect to the x axis in the plane (x and y planes) orthogonal to the traveling direction (z direction). Therefore, the P-polarized component of the light (another 1/(2n) of the entire passing light) which passes through the rotating diaphragm 199 in the state where the passage region is 45° turns into a polarized component of 45° in the same direction as the angle of the passage region, and the S-polarized component of that turns into a polarized component of 135° orthogonal to the angle of the passage region. In that case, the optic axis of the rotating half-wave plate 190 is set to an angle which is calculated by adding m (m being an integer) times 45° to 22.5°. Thereby, the P-polarized component and the S-polarized component which have passed through the rotating half-wave plate 190 can be converted into a polarized wave of 0° (polarized wave in the first direction) and a polarized wave of 90° (polarized wave in the second direction). In the example of FIG. 8B, the S-polarized component becomes a polarized wave of 0° (polarized wave in the first direction), and the P-polarized component becomes a polarized wave of 90° (polarized wave in the second direction).

Thus, the scanning operation in the case of the angle of the passage region of the rotating diaphragm 199 being 45° is completed. Next, again, it returns to the angle setting step (S212) for rotating diaphragm and half-wave plate. Then, the angle of the passage region of the rotating diaphragm 199 and the angle of the optic axis of the half-wave plate are changed, and the scanning step (S214) is carried out similarly.

Figure 8C:
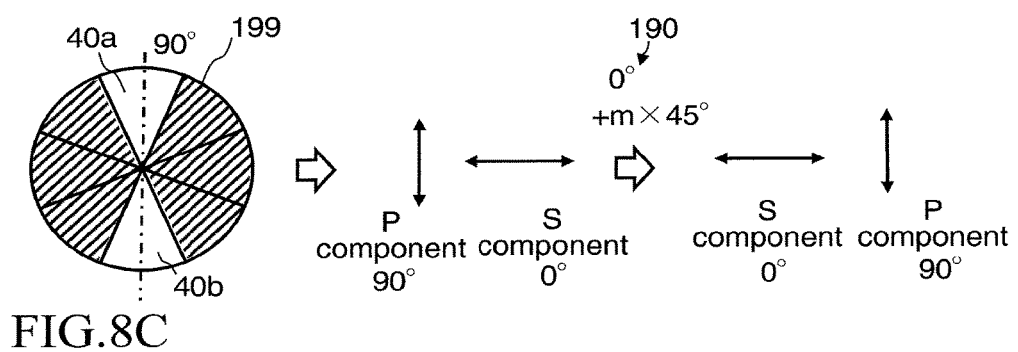

The example of FIG. 8C shows the case where the passage region configured by the two regions 40a and 40b of the rotating diaphragm 199 is set to 90° position with respect to the x axis in the plane (x and y planes) orthogonal to the traveling direction (z direction). Therefore, the P-polarized component of the light (another 1/(2n) of the entire passing light) which passes through the rotating diaphragm 199 in the state where the passage region is 90° turns into a polarized component of 90° in the same direction as the angle of the passage region, and the S-polarized component of that turns into a polarized component of 0° (180°) orthogonal to the angle of the passage region. In that case, the optic axis of the rotating half-wave plate 190 is set to an angle which is calculated by adding m (m being an integer) times 45° to 0°. Thereby, the P-polarized component and the S-polarized component which have passed through the rotating half-wave plate 190 can be converted into a polarized wave of 0° (polarized wave in the first direction) and a polarized wave of 90° (polarized wave in the second direction). In the example of FIG. 8C, the S-polarized component becomes a polarized wave of 0° (polarized wave in the first direction), and the P-polarized component becomes a polarized wave of 90° (polarized wave in the second direction).

Thus, the scanning operation in the case of the angle of the passage region of the rotating diaphragm 199 being 90° is completed. Next, again, it returns to the angle setting step (S212) for rotating diaphragm and half-wave plate. Then, the angle of the passage region of the rotating diaphragm 199 and the angle of the optic axis of the half-wave plate are changed, and the scanning step (S214) is carried out similarly.

Figure 8D:
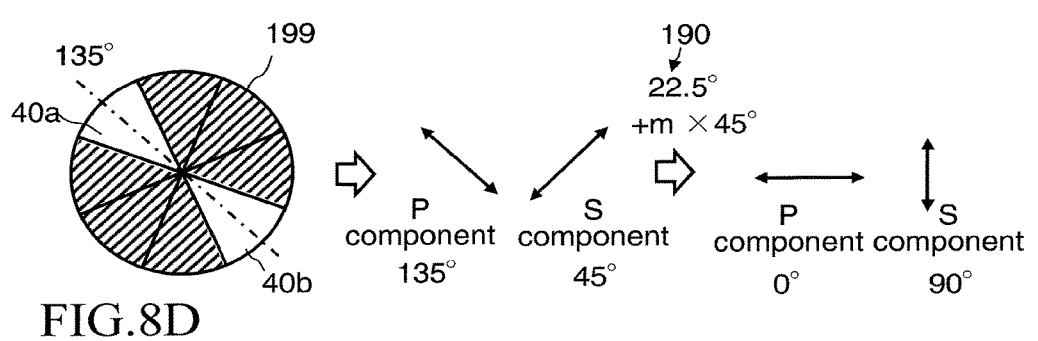

The example of FIG. 8D shows the case where the passage region configured by the two regions 40a and 40b of the rotating diaphragm 199 is set to 135° position with respect to the x axis in the plane (x and y planes) orthogonal to the traveling direction (z direction). Therefore, the P-polarized component of the light (another 1/(2n) of the entire passing light) which passes through the rotating diaphragm 199 in the state where the passage region is 135° turns into a polarized component of 135° in the same direction as the angle of the passage region, and the S-polarized component of that turns into a polarized component of 45° orthogonal to the angle of the passage region. In that case, the optic axis of the rotating half-wave plate 190 is set to an angle which is calculated by adding m (m being an integer) times 45° to 22.5°. Thereby, the P-polarized component and the S-polarized component which have passed through the rotating half-wave plate 190 can be converted into a polarized wave of 0° (polarized wave in the first direction) and a polarized wave of 90° (polarized wave in the second direction). In the example of FIG. 8D, the P-polarized component becomes a polarized wave of 0° (polarized wave in the first direction), and the S-polarized component becomes a polarized wave of 90° (polarized wave in the second direction).

Thus, as the optical image of a polarized wave of 0° (polarized wave in the first direction), the photodiode array 105 (first image sensor) captures an optical image of the P-polarized component wave and an optical image of the S-polarized component wave while replacing them with each other depending on the angle of the passage region of the rotating diaphragm 199. Similarly, as the optical image of a polarized wave of 90° (polarized wave in the second direction), the photodiode array 205 (second image sensor) captures an optical image of the S-polarized component wave and an optical image of the P-polarized component wave while replacing them with each other depending on the angle of the passage region of the rotating diaphragm 199.

As described above, while changing the angles of the rotating diaphragm 199 and the rotating half-wave plate 190, the photodiode arrays 105 and 205 capture optical images of a pattern formed on the mask substrate 101, with respect to each angle of the rotating diaphragm 199. Accordingly, it is possible to acquire optical images of the four (2n) polarized waves of the P-polarized component and optical images of the four (2n) polarized waves of the S-polarized component at the angles 0°, 45°, 90°, and 135° of the passage region of the rotating diaphragm 199. Therefore, since the number of combining elements is larger than that of capturing one by one an optical image of P-polarized wave and an optical image of S-polarized wave so as to combine them, the degree of freedom of combining can be greatly increased. Furthermore, since the light amount for obtaining each of eight (2×2n) optical images is narrowed by the rotating diaphragm 199 at each image-capturing time, the light amount for obtaining totally eight (2×2n) optical images can be the same as the light amount for obtaining one optical image of random polarization (natural polarization) light.

Thus, according to the first embodiment, it is possible to acquire respective polarized images of 2n (e.g., four) S-polarized waves and 2n (e.g., four) P-polarized waves which are the bases for generating an exposure image to be exposed and transferred by the exposure apparatus. Then, an exposure image can be generated by adjusting the acquired 2n P-polarized wave images to be in accordance with the state of the P-polarized component, where the amplitude is reduced, removed, or inverted due to the objective lens 302 (reduction optical system) of the exposure apparatus, and combining them with the 2n S-polarized wave images. According to the first embodiment, since image-capturing is performed, for each angle of the passage region of the rotating diaphragm 199, in the state where the S-polarized wave and the P-polarized wave are separated from each other, it is possible to adjust a polarized component image at each angle of the passage region of the rotating diaphragm 199.

The inspection apparatus 100 of the first embodiment performs a pattern inspection of the mask substrate 101 by further utilizing respective polarized images of the 2n S-polarized waves and the 2n P-polarized waves.

Figure 11:
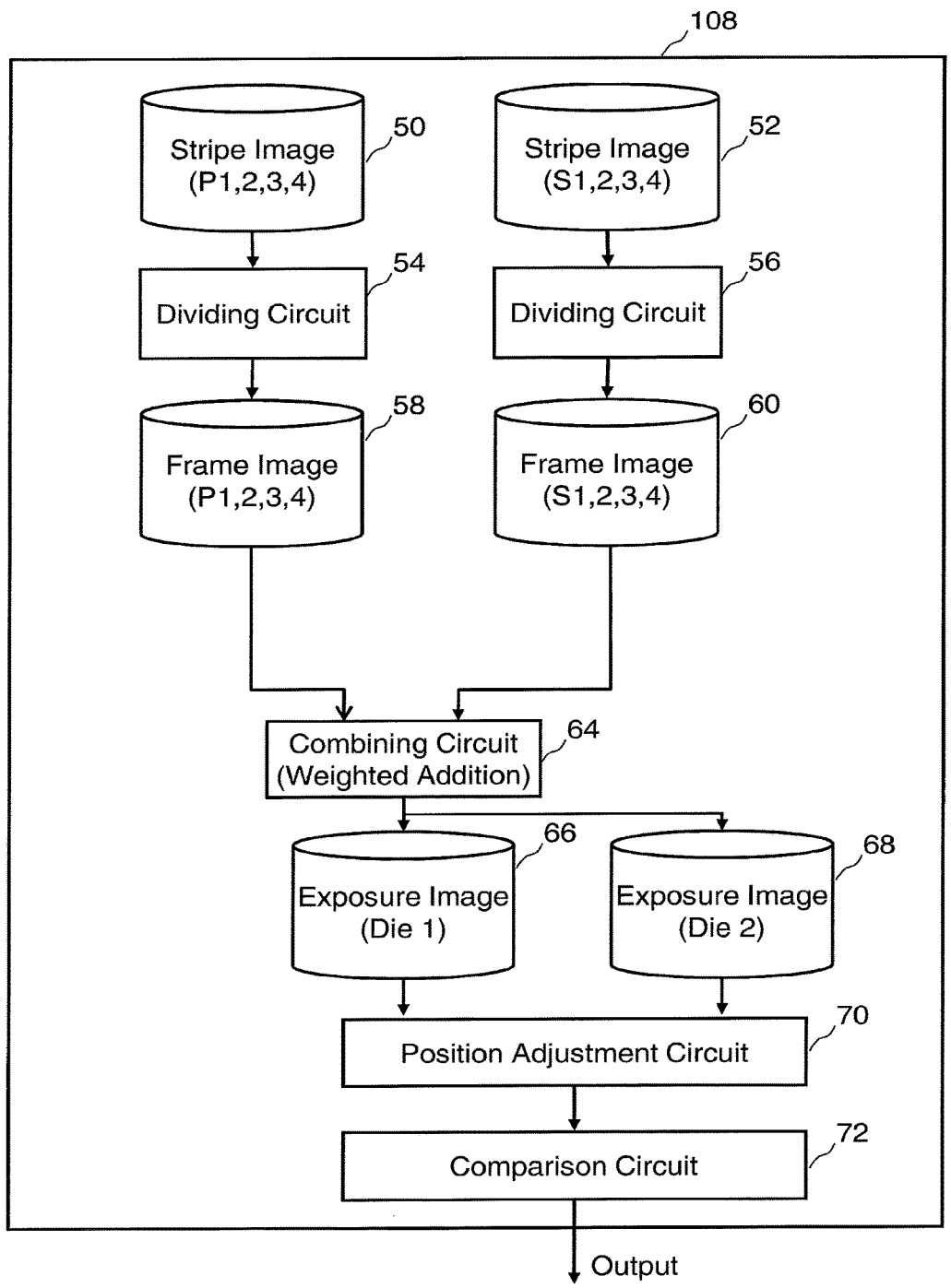
FIG. 11 shows apart of an internal configuration of a comparison circuit according to the first embodiment.

FIG. 11 shows a part of an internal configuration of a comparison circuit according to the first embodiment. In the comparison circuit 108 of FIG. 11, there are arranged storage devices 50, 52, 58, 60, 66, and 68 such as magnetic disk drives, dividing circuits 54 and 56, a combining circuit 64, a position adjustment circuit 70, and a comparison circuit 72. FIG. 11 shows the configuration necessary for the polarized image inspection mode (1). Since the configuration necessary for the general inspection mode (2) may be the same as the conventional configuration, it is not shown in the figure.

In the comparison circuit 108, stripe region images SP1 to SP4 (optical images) of 2n (e.g., four) P-polarized waves of the inspection stripe 20 are stored in the storage device 50. Then, the dividing circuit 54 (dividing unit) reads the stripe region image of each P-polarized wave, and divides it by a predetermined size (e.g., the same width as the scan width W) in the x direction. For example, it is divided into frame images each having 512×512 pixels. Thereby, frame images P1 to P4 of 2n (e.g., four) P-polarized waves of each frame region 30 can be acquired with respect to a plurality of frame regions 30 (FIG. 10) obtained by dividing the inspection stripe 20 by the same width as the scan width W, for example. The frame images P1 to P4 of the 2n (e.g., four) P-polarized waves are stored in the storage device 58.

Similarly, stripe region images SS1 to SS4 (optical images) of 2n (e.g., four) S-polarized waves of the inspection stripe 20 are stored in the storage device 52. Then, the dividing circuit 56 (dividing unit) reads the stripe region image of each S-polarized wave, and divides it by a predetermined size (e.g., the same width as the scan width W) in the x direction. For example, it is divided into frame images each having 512×512 pixels. Thereby, frame images S1 to S4 of 2n (e.g., four) S-polarized waves of each frame region 30 can be acquired. The frame images S1 to S4 of the S-polarized waves are stored in the storage device 60.

In the combining step (S2290), the combining circuit 64 (combining unit) combines optical images of 2n polarized waves of the P-polarized component and optical images of 2n polarized waves of the S-polarized component which have been image-captured for each angle of the passage region of the rotating diaphragm 199. In that case, combining is performed after adding weight to the gray scale value of each of 2×2n optical images. The rate of weighting given to each of the 2×2n optical images should be set to be close to an exposure image as much as possible while considering the amplitude quantity (ratio), etc. of the P-polarized component which is reduced, removed, or inverted due to the objective lens 302 (reduction optical system) of the exposure apparatus. According to the first embodiment, since the number of optical images to be combined is large, being 4n (2×2n), the degree of freedom for adjusting the value of weighting given to each optical image can be increased. As a result, the combined frame image to be generated can be close to an exposure image.

Thus, on the die (1) (first die) to be inspected, there is generated a combined frame image (first die image) in which optical images of 2n polarized waves of the P-polarized component and optical images of 2n polarized waves of the S-polarized component are combined. The combined frame image of the die (1) is stored in the storage device 66.

In the first embodiment, the "die-to-die inspection" which compares data of optical images of identical patterns captured at different positions on the same mask is performed. For example, the stripe region image described above includes images of two dies where identical patterns are formed. Then, to be corresponding to the frame region 30 of the combined frame image of the die (1), a combined frame image (second die image) of the frame region 30 of the die (2) (second die) is generated in a similar manner. That is, on the die (2) (second die) where the same pattern as that of the die (1) is formed, there is generated a combined frame image (second die image) in which optical images of 2n polarized waves of the P-polarized component and optical images of 2n polarized waves of the S-polarized component are combined, and which is corresponding to the combined frame image (first die image) of the die (1). The combined frame image of the die (2) is stored in the storage device 68.

The position adjustment circuit 70 performs position adjustment, using a predetermined algorithm, between the combined frame image (optical image) of the die (1) to be compared, and the combined frame image (reference image) of the die (2) to be compared. For example, the position adjustment is performed using a least-squares method.

In the comparison step (S230), the comparison circuit 72 compares the combined frame image (first die image) of the die (1) and the combined frame image (second die image) of the die (2) where the same pattern as that of the die (1) is formed. The combined frame image (first die image) of the die (1) is obtained by combining optical images of 2n polarized waves of the P-polarized component and optical images of 2n polarized waves of the S-polarized component. The combined frame image (second die image) of the die (2) is obtained by combining optical images of 2n polarized waves of the P-polarized component and optical images of 2n polarized waves of the S-polarized component.

With respect to the combined frame image generated in the first embodiment, it is intended that the numerical aperture NAo of the objective lens 171 is set to be adjusted to the same conditions as those of the exposure apparatus. Therefore, the numerical aperture NAo of the objective lens 171 is smaller than that of the objective lens used in the conventional pattern defect inspection apparatus with high resolution. Accordingly, since the light flux incident to the objective lens 171 is small, the resolution of an image is inferior to that of the conventional pattern defect inspection apparatus with high resolution. On the other hand, when exposing and transferring a mask pattern onto a wafer in the actual exposure apparatus, if disconnection or/and short-circuiting of the circuit due to a defect does not occur on the wafer, this pattern can be used as an integrated circuit. Since the combined frame image according to the first embodiment is intentionally generated to be adjusted to be the same image as an exposure image exposed on the wafer by the exposure apparatus, it is sufficient to inspect whether disconnection or/and short-circuiting of the circuit occurs on the wafer or not. Therefore, the comparison circuit 72 inspects the distance between adjacent patterns, not inspecting an individual shape defect of each figure pattern. In such a case, the comparison circuit 72 measures the distance between respective patterns in the combined frame image (first die image), and similarly measures the distance between respective patterns in the combined frame image (second die image). Then, it is determined whether the difference obtained by subtracting the distance between, patterns corresponding to the combined frame image (second die image) from the distance between patterns of the combined frame image (first die image) is larger than a determination threshold value, and if larger, it is determined that there is a defect. Then, the comparison result is output. The comparison result may be output to the magnetic disk drive 109, the magnetic tape drive 115, the flexible disk device (FD) 116, the CRT 117, and the pattern monitor 118, or output from the printer 119.

As described above, according to the first embodiment, since respective polarized images of the 2n S-polarized waves and the 2n P-polarized waves can be acquired, it is possible to perform a pattern inspection of the mask substrate 101 by utilizing the respective polarized images of the 2n S-polarized waves and the 2n P-polarized waves.

Next, the case of selecting the general inspection mode (2) in the mode selection step (S102) will now be described below.

Figure 12:
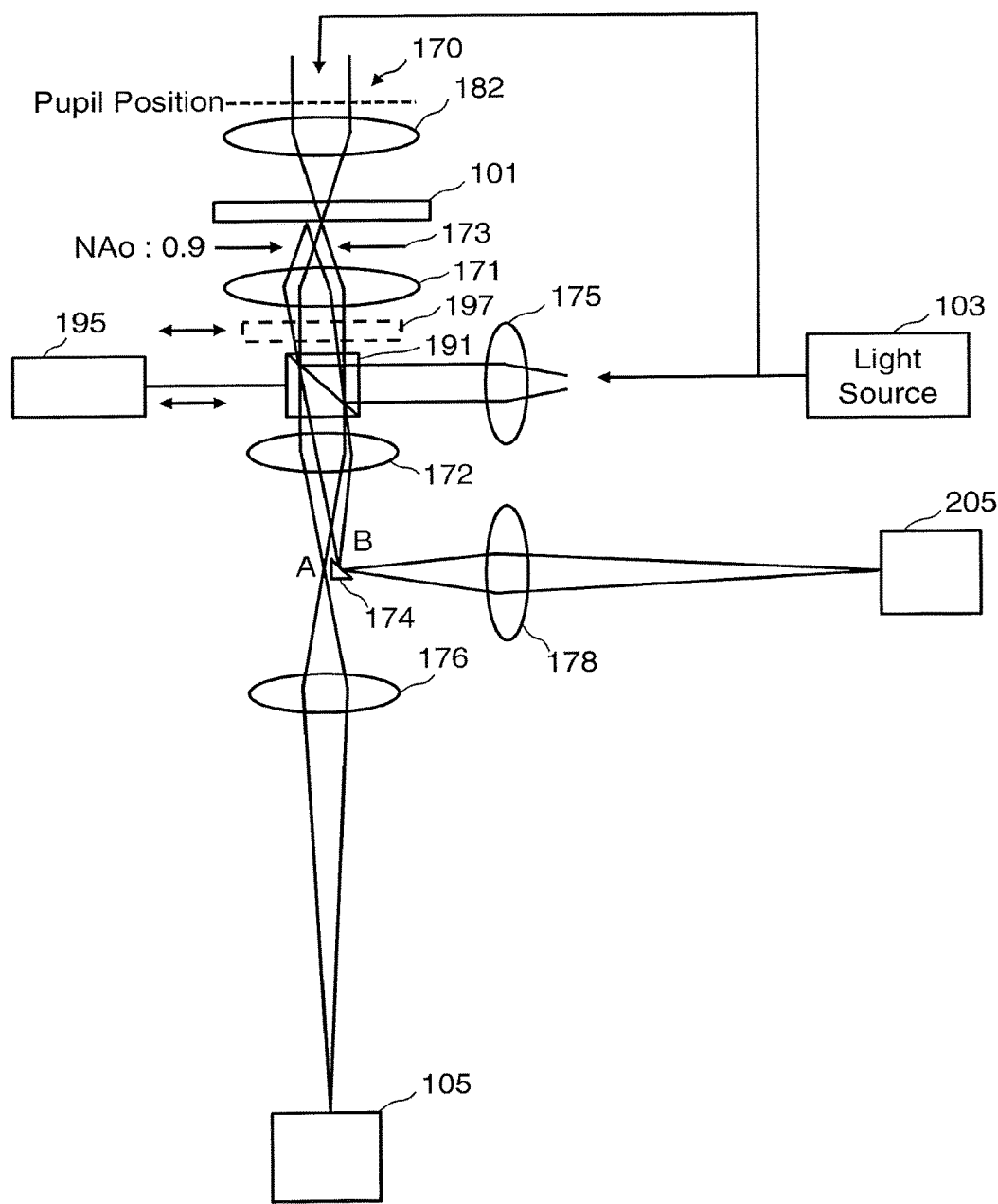
FIG. 12 shows an example of the configuration of the inspection optical system in the general inspection mode according to the first embodiment.

FIG. 12 shows an example of the configuration of the inspection optical system in the general inspection mode according to the first embodiment. FIG. 12 shows a part of the configuration of FIG. 1. Reduction scales, etc. of positions of respective configuration elements in FIGS. 1 and 12 are not coincident.

In the taking-out step (S104), the rotating diaphragm 199, the rotating half-wave plate 190, and the Rochon prism 192 are moved from the inside to the outside of the optical path by a transfer mechanism which moves the rotating diaphragm 199, the rotating half-wave plate 190, and the Rochon prism 192 between the inside and the outside of the optical path. Specifically, the transfer mechanism 194 (a part of first transfer mechanism) moves the rotating diaphragm 199 and the rotating half-wave plate 190 from the inside to the outside of the optical path, under the control of the mode switching control circuit 140. If the rotating diaphragm 199 and the rotating half-wave plate 190 have been arranged outside the optical path from the first, this operation is to be omitted.

Moreover, the transfer mechanism 196 (another part of first transfer mechanism) moves the Rochon prism 192 from the inside to the outside of the optical path, under the control of the mode switching control circuit 140. If the Rochon prism 192 has been arranged outside the optical path from the first, this operation is to be omitted.

In the taking-in step (S106), the beam splitter 191 is moved from the outside to the inside of the optical path by a transfer mechanism which moves the beam splitter 191 between the inside and the outside of the optical path. Specifically, the transfer mechanism 195 (second transfer mechanism) moves the beam splitter 191 from the outside to the inside of the optical path, under the control of the mode switching control circuit 140. The beam splitter 191 is placed close to the space region in the optical path which is made by taking out the Rochon prism 192 from the inside to the outside of the optical path. As the beam splitter 191, a polarizing beam splitter may be used, or a non-polarizing beam splitter may be used. When using a polarizing beam splitter, it is preferable to use a quarter-wave plate 197 ($\lambda/4$ wave plate) with the polarizing beam splitter. In that case, the quarter-wave plate 197 is preferably arranged between the beam splitter 191 and the objective lens 171. By arranging the quarter-wave plate 197, a linearly polarized light having passed through the polarizing beam splitter can be converted into a circularly polarized illumination light. Thereby, the necessity of considering the relation between the polarization direction of an illumination light and the pattern shape can be eliminated. Moreover, since a reflected light being a circularly polarized light from the mask substrate 101 can be converted into a linearly polarized light, it is possible to inhibit loss of the light quantity of the reflected light at the time of passing through the polarizing beam splitter toward the sensor side, by adjusting the arrangement angle of the quarter-wave plate 197. Also, since a transmitted light being a circularly polarized light can be converted into a linearly polarized light, it is possible to inhibit loss of the light quantity of the transmitted light at the time of passing through the polarizing beam splitter toward the sensor side.

In the diaphragm release step (S108), the mode switching control circuit 140 makes NAo of the objective lens 171 equal to that used in a general inspection with high resolution, by widening the diameter of the aperture of the diaphragm 173 in order to increase the light flux which can pass therethrough. For example, NAo of the objective lens of the inspection apparatus 100 is set to NAo=0.9. Alternatively, the aperture of the diaphragm 173 may be completely open.

In the illumination optical system switching step (S110), the illumination shape switching mechanism 181 moves optical elements for illumination of the exposure apparatus from the inside to the outside of the optical path so that the shape of an illumination light (inspection light) for transmission inspection may become the illumination shape used in a general inspection. Alternatively, optical elements including a lens, a mirror, etc. are switched for a general inspection.

In the scanning step (S112), the optical image acquisition mechanism 150 acquires an optical image of a pattern formed on the mask substrate 101. Specifically, it operates as described below.

In FIG. 12, there is generated a laser light (e.g., DUV light) being an inspection light from the light source 103, whose wavelength is equal to or shorter than that of the ultraviolet region. The generated light branches, by a half mirror, etc. (not shown), into an inspection light for transmission inspection, and an inspection light for reflection inspection. The inspection light for transmission inspection enters the image forming lens 182 through the illumination shape switching mechanism 181 by the projection lens 180 of the transmission inspection illumination optical system 170. The inspection light (second illumination light) for transmission inspection is focused to form an image on the pattern forming surface of the mask substrate 101, from the back side opposite to the pattern forming surface of the mask substrate 101, by the image forming lens 182 of the transmission inspection illumination optical system 170. The transmitted light (mask pattern image) having passed through the mask substrate 101 enters the objective lens 171, whose diaphragm has been released, and is projected in parallel onto the image forming lens 172 through the beam splitter 191 by the objective lens 171.

On the other hand, the inspection light (third illumination light) for reflection inspection is projected onto the beam splitter 191 by the reflection inspection illumination optical system 175. Then, the inspection light for reflection inspection reflected by the beam splitter 191 enters the objective lens 171, and is focused to form an image on the pattern forming surface of the mask substrate 101, from the pattern forming surface side of the mask substrate 101, by the objective lens 171. On this occasion, the inspection light for reflection inspection is focused to form an image at a position different from that of the inspection light for transmission inspection, on the pattern forming surface. In other words, the reflection inspection illumination optical system 175 projects an inspection light for reflection inspection onto the beam splitter 191 such that the inspection light for reflection inspection is focused to formed an image at a position different from that of the inspection light for transmission inspection, on the pattern forming surface of the mask substrate 101. Actually, the inspection light for transmission inspection and the inspection light for reflection inspection illuminate positions very close to each other in the same stripe region 20. The reflected light (mask pattern image) reflected from the mask substrate 101 enters the objective lens 171, whose diaphragm has been released, and is projected in parallel onto the image forming lens 172 through the beam splitter 191 by the objective lens 171. Thus, the beam splitter 191 branches an illumination light to go to the objective lens 171, and makes a reflected light from the mask substrate 101 pass through the beam splitter 191 via the objective lens 171.

As described above, a transmitted light (second transmitted light), which is an inspection light (second illumination light) for transmission inspection having passed through the mask substrate 101, and a reflected light, which is an inspection light (third illumination light) for reflection inspection having been reflected from the mask substrate 101, enter the image forming lens 172 through the objective lens 171 and the beam splitter 191. In such a case, since the inspection light for transmission inspection and the inspection light for reflection inspection illuminate different positions on the mask substrate 101, when the transmitted light and reflected light from the mask substrate 101 enter the objective lens 171, their optical paths are different from each other. Therefore, it is possible to make the transmitted light and reflected light from the mask substrate 101, projected by the objective lens 171, enter the image forming lens 172 at different incident positions.

According to the first embodiment, in the case of a general pattern inspection, the image forming lens 172 focuses one of a transmitted light and a reflected light (here, e.g., transmitted light) at an image formation position A which is for one of a polarized wave of 0° and a polarized wave of 90° (here, e.g., polarized wave of 0°) in the polarized image inspection mode (1), and focuses the other one of the transmitted light and the reflected light (here, e.g., reflected light) at an image formation position B which is for the other one of the polarized wave of 0° and the polarized wave of 90° (here, e.g., polarized wave of 90°).

When the one of the transmitted light and the reflected light from the mask substrate 101 is focused to form an image at its corresponding one of the image formation positions A and B, the mirror 174 reflects the other one of the lights at the other one of the image formation positions A and B. In the case of FIG. 12, with respect to a polarized wave of 0° and a polarized wave of 90° in the polarized image inspection mode (1), the mirror 174 reflects a reflected light from the mask substrate 101 at the image formation position B of the polarized wave of 90° which is different from the image formation position A of the polarized wave of 0°.

One of a transmitted light and a reflected light (in the case of FIG. 12, a transmitted light) from the mask substrate 101 on whose optical path no mirror 174 is placed goes, after forming an image at the image formation position A of the polarized wave of 0° in the polarized image inspection mode (1), straight to enter the image forming lens 176. The image forming lens 176 (first image forming lens) makes the incident light form an image on the photodiode array 105, with a numerical aperture (NAi=0.004) for a general inspection.

The photodiode array 105 (first image sensor) captures an image (e.g., image of transmitted light of mask substrate 101) (third image), formed by the image forming lens 176, of one of the transmitted light and reflected light from the mask substrate 101.

With respect to the other one of the transmitted light and the reflected light (in the case of FIG. 12, a reflected light) from the mask substrate 101 on whose optical path the mirror 174 is placed, after forming an image at the image formation position B of the polarized wave of 90°, it is reflected by the mirror 174 so as to enter the image forming lens 178. The image forming lens 178 (second image forming lens) makes the incident light form an image on the photodiode array 205, with a numerical aperture (NAi=0.004) for a general inspection.

The photodiode array 205 (second image sensor) captures an image (e.g., image of reflected light) (fourth image), formed by the image forming lens 178, of the other one of the transmitted light and the reflected light from the mask substrate 101.

The respect that each of the photodiode arrays 105 and 205 continuously captures optical images each having a scan width W as shown in FIG. 10 is the same as that of the polarized image inspection mode (1). In other words, while moving relatively to the XYθ table 102, the photodiode arrays 105 and 205, being examples of a sensor, simultaneously capture optical images of a pattern formed on the mask substrate 101, using an inspection light for transmission and an inspection light for reflection.

The pattern image of a transmitted light formed on the photodiode array 105 is photoelectrically converted by each light receiving element of the photodiode array 105, and further analog-to-digital (A/D) converted by the sensor circuit 106. Then, pixel data for the inspection stripe 20 to be measured is stored in the stripe pattern memory 123. When capturing an image of the pixel data (stripe region image), it is preferable to use, as the dynamic range of the photodiode array 105, a dynamic range where 60% incidence case of the illumination light amount is the maximum gray level, for example.

On the other hand, the pattern image of a reflected light formed on the photodiode array 205 is photoelectrically converted by each light receiving element of the photodiode array 205, and further analog-to-digital (A/D) converted by the sensor circuit 206. Then, pixel data for the inspection stripe 20 to be measured is stored in the stripe pattern memory 223. When capturing an image of the pixel data (stripe region image), it is preferable to use, as the dynamic range of the photodiode array 205, a dynamic range where 60% incidence case of the illumination light amount is the maximum gray level, for example.

When acquiring an optical image of the inspection stripe 20, the laser length measuring system 122 measures the position of the XYθ table 102. The measured position information is output to the position circuit 107. The position circuit 107 (calculation unit) calculates the position of the mask substrate 101 by using the measured position information.

Then, the stripe region image of a transmitted light is sent to the comparison circuit 108, with data indicating the position of the mask substrate 101 on the XYθ table 102 output from the position circuit 107. Measured data (pixel data) of a transmitted light is, for example, 8-bit unsigned data, and indicates gradation of brightness (light intensity) of each pixel. The stripe region image of the transmitted light output into the comparison circuit 108 is stored in a storage device to be described later.

Similarly, the stripe region image of a reflected light is sent to the comparison circuit 108, with data indicating the position of the mask substrate 101 on the XYθ table 102 output from the position circuit 107. Measured data (pixel data) of a reflected light is, for example, 8-bit unsigned data, and indicates gradation of brightness (light intensity) of each pixel. The stripe region image of the reflected light output into the comparison circuit 108 is stored in a storage device to be described later.

The inspection apparatus 100 of the first embodiment performs pattern inspection with respect to the pattern image of the transmitted light. Similarly, pattern inspection is performed with respect to the pattern image of the reflected light.

In the comparison circuit 108, there are arranged a storage device such as a magnetic disk drive (not shown), a dividing circuit, a position adjustment circuit, and a comparison circuit. In the comparison circuit 108, the dividing circuit (not shown) reads a stripe region image of a transmitted light, and divides it by a predetermined size (e.g., the same width as the scan width W) in the x direction. For example, it is divided into frame images each having 512×512 pixels. Thereby, a frame image of a transmitted light of each frame region 30 can be acquired with respect to a plurality of frame regions 30 (FIG. 10) obtained by dividing the inspection stripe 20 by the same width as the scan width W, for example. The frame image of the transmitted light is stored in a storage device (not shown).

In the first embodiment, the "die-to-die inspection" which compares data of optical images of identical patterns captured at different positions on the same mask is performed. For example, the stripe region image described above includes images of two dies where identical patterns are formed. Then, to be corresponding to the frame region 30 of the die (1), a frame image of the frame region 30 of the die (2) (second die) is generated in a similar manner.

The position adjustment circuit (not shown) performs position adjustment, using a predetermined algorithm, between the frame image (third optical image) of a transmitted light of the die (1) to be compared, and the frame image (fourth optical image) of a transmitted light of the die (2) to be compared. For example, the position adjustment is performed using a least-squares method.

The comparison circuit (not shown) compares, for each pixel, the frame image (third optical image) of the transmitted light of the die (1) and the frame image (fourth optical image) of the transmitted light of the die (2) between which position adjustment has been performed. They are compared, for each pixel, according to predetermined determination conditions, using a predetermined determination threshold value, in order to determine whether there is a defect such as a shape defect or not. For example, if a gray scale value difference for each pixel is larger than a determination threshold value Th, it is determined to be a candidate defect. Then, the comparison result is output. The comparison result may be output to the storage device 109, the CRT 117, or the pattern monitor 118, or output from the printer 119.

Alternatively, the "die-to-database inspection" may be performed which compares an optical image with a reference image generated from design data (writing data) being a basis for forming a pattern on the mask substrate 101.

In such a case, the reference image generation circuit 112 generates, for each frame region 30, a reference image based on pattern data defined in the design data (writing data) which is a basis for forming a pattern on the mask substrate 101. Specifically, it operates as follows: First, the reference image generation circuit 112 reads pattern data defined in the design data (writing data) from the storage device 109 through the control computer 110, and converts each figure pattern defined in the read design pattern data into image data of binary or multiple values.

Here, basics of figures defined by the design pattern data are, for example, rectangles and triangles. For example, there is stored figure data defining the shape, size, position, and the like of each pattern figure by using information, such as coordinates (x, y) of the reference position of the figure, lengths of sides of the figure, and a figure code serving as an identifier for identifying the figure type such as a rectangle, a triangle and the like.

When design pattern data, used as figure data, is input to the reference image generation circuit 112, the data is developed into data of each figure. Then, figure codes, figure dimensions and the like indicating figure shapes in the data of each figure are interpreted. Then, the reference image generation circuit 112 develops each figure data to design pattern image data of binary or multiple values as patterns to be arranged in mesh regions in units of grids of predetermined quantization dimensions, and outputs the developed data. In other words, the reference image generation circuit 112 reads design data, calculates an occupancy rate occupied by a figure in the design pattern, for each mesh region obtained by virtually dividing an inspection region into mesh regions in units of predetermined dimensions, and outputs n-bit occupancy rate data. For example, it is preferable that one mesh region is set as one pixel. Assuming that one pixel has a resolution of $\frac{1}{2}^8$ (=$\frac{1}{256}$), the occupancy rate in each pixel is calculated by allocating small regions which corresponds to the region of the figures arranged in the pixel concerned and each of which is corresponding to a $\frac{1}{256}$ resolution. Then, 8-bit occupancy rate data is output to the reference circuit 112. The mesh region (inspection pixel) may be in accordance with the pixel of measured data.

Next, the reference image generation circuit 112 performs appropriate filter processing on design image data of a design pattern which is image data of a figure. Since optical image data as a measured image is in the state affected by filtering performed by the optical system, in other words, in the analog state continuously changing, it becomes possible to match/fit the design image data with the measured data by also applying a filtering process to the design image data being image data on the design side whose image intensity (gray value) is represented by digital values. The generated image data of a reference image is input into the comparison circuit 108 to be stored in a memory (not shown).

The position adjustment circuit (not shown) performs position adjustment, using a predetermined algorithm, between the frame image (third optical image) of a transmitted light to be compared, and the reference image to be compared. For example, the position adjustment is performed using a least-squares method.

The comparison circuit (not shown) compares, for each pixel, the frame image (third optical image) and the reference image to be compared, between which position adjustment has been performed. They are compared, for each pixel, according to predetermined determination conditions, using a predetermined determination threshold value, in order to determine, for example, whether there is a defect such as a shape defect or not, for. For example, if a gray scale value difference of each pixel is larger than a determination threshold value Th, it is determined to be a candidate defect. Then, the comparison result is output. The comparison result may be output to the storage device 109, the CRT 117, or the pattern monitor 118, or output from the printer 119.

Also, with respect to a stripe region image of a reflected light, the same processing as that performed for a stripe region image of a transmitted light is performed. Thereby, a pattern inspection using a transmitted light and a pattern inspection using a reflected light can be performed at the same period. By performing both the transmission inspection and the reflection inspection, a pseudo defect can be eliminated and inspection accuracy can be improved.

As described above, when acquiring a polarized image, the rotating diaphragm 199, the rotating half-wave plate 190, and the Rochon prism 192 are arranged instead of the beam splitter 191, in the optical path, and when performing a general pattern inspection, the beam splitter 191 is arranged instead of the rotating diaphragm 199, the rotating half-wave plate 190, and the Rochon prism 191, in the optical path. Then, for example, the angle of the polarization plane of the Rochon prism 192 is adjusted so that the objective lens 171, the image forming lens 172, and the mirror 174, which are used in the general inspection mode (2), can be used as they are in the polarized image inspection mode (1) without changing their arrangement position, and the photodiode arrays 105 and 205 in the general inspection mode (2) can be used as they are in the polarized image inspection mode (1) without changing their arrangement position. Thereby, even when, in the general inspection mode (2), capturing images of patterns at different positions on the mask substrate 101 as one for a transmitted image and the other for a reflected image, and forming the images at different positions, it is possible, after separating an image at one position on the mask substrate 101 into a polarized wave of 0° and a polarized wave of 90°, to adjust one of the image formation position of the polarized wave of 0° and the image formation position of the polarized wave of 90° to one of the image formation position of the transmitted image and the image formation position of the reflected image in order to shift the trajectory by the Rochon prism 191. Similarly, it is possible to adjust the other one of the image formation position of the polarized wave of 0° and the image formation position of the polarized wave of 90° to the other one of the image formation position of the transmitted image and the image formation position of the reflected image. Thus, in addition to being able to perform the polarized image inspection (1), further, it is possible to simultaneously perform a transmission inspection and a reflection inspection in the general inspection mode (2).

As described above, according to the first embodiment, a polarized image can be acquired to be used for generating an exposure image with a high freedom to be exposed and transferred by the exposure apparatus. Moreover, the image forming optical system including the mirror 174 can be used in common between polarized image acquisition and general pattern inspection.

In the above description, each " . . . circuit" includes a processing circuitry. As the processing circuitry, for example, an electric circuit, computer, processor, circuit board, quantum circuit, semiconductor device, or the like can be used. Each " . . . circuit" may use a common processing circuitry (same processing circuitry), or different processing circuitries (separate processing circuitries). A program for causing a processor to execute processing may be stored in a recording medium, such as a magnetic disk drive, magnetic tape drive, FD, ROM (Read Only Memory), etc. For example, the position circuit 107, the comparison circuit 108, and the reference image generation circuit 112 may be configured by at least one circuit described above. Similarly, the dividing circuits 54 and 56, the combining circuit 64, the position adjustment circuit 70, and the comparison circuit 72 can be configured by the processing circuits described above.

Embodiments have been explained referring to specific examples described above. However, the present invention is not limited to these specific examples. In the above examples, frame images of 2n P-polarized waves and frame images of 2n S-polarized waves are combined by weighted addition so as to be adjusted to an exposure image, but, it is not limited thereto. Since the die-to-die inspection is being performed, as long as images are combined by using the same condition, it is not necessarily required to be adjusted to an exposure image. Therefore, combining may be performed based on a ratio different from the exposure image. Alternatively, without performing combining, each of frame images of 2n P-polarized waves and 2n S-polarized waves in the die (1), and a corresponding one of frame images of 2n P-polarized waves and 2n S-polarized waves in the die (2) may be independently inspected. Moreover, although, in the examples described above, the distance between adjacent patterns is inspected, it is not limited thereto. For example, a gray scale value of a combined frame image (first die image) and that of a combined frame image (second die image) may be compared for each pixel, using a predetermined algorithm. For example, if a difference obtained by subtracting the gray scale value of the combined frame image (second die image) from that of the combined frame image (first die image) is larger than a threshold value, it may be determined that there is a defect.

Moreover, although, in the cases described above, frame images of 2n P-polarized waves and frame images of 2n S-polarized waves are combined simultaneously, it is not limited thereto. For example, it is also preferable to combine frame images of 2n P-polarized waves, and combine frame images of 2n S-polarized waves, and then further, combine the combined frame image of P-polarized wave and the combined frame image of S-polarized wave.

While the apparatus configuration, control method, and the like not directly necessary for explaining the present invention are not described, some or all of them can be selectively and appropriately used on a case-by-case basis when needed.

Moreover, any other polarized image acquisition apparatus, pattern inspection apparatus, and polarized image acquisition method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polarized image acquisition apparatus comprising:
   a stage configured to be movable and to mount thereon a mask substrate for exposure on which a pattern is formed;
   an objective lens configured to receive a transmitted light having passed through the mask substrate;
   a diaphragm configured to be rotatable, to restrict a passage region of a light having passed through the objective lens to two regions opposite to each other with respect to a central axis in 4n equal regions divided rotationally symmetrically in a plane orthogonal to a traveling direction of the light having passed through the objective lens, and to change an angle of the passage region so that each the two regions of the 4n equal regions become passage regions in order;
   a rotating half-wave plate configured to convert, for each of the angle of the passage region, a P-polarized component having passed through the diaphragm and being in same direction as the angle of the passage region and an S-polarized component having passed through the diaphragm and being in a direction orthogonal to the angle of the passage region into a polarized wave in a first direction and a polarized wave in a second direction, where the first and second directions have been set previously and are orthogonal to each other;
   a Rochon prism configured to separate a trajectory of the polarized wave in the first direction from a trajectory of the polarized wave in the second direction;
   an image forming lens configured to focus and form an image of the polarized wave in the first direction having passed through the Rochon prism, at an image formation position, and an image of the polarized wave in the second direction having passed through the Rochon prism, at an other image formation position;
   a mirror configured to reflect the polarized wave in the second direction, at the other image formation position of the polarized wave in the second direction which is different from the image formation position of the polarized wave in the first direction;
   a first image sensor configured to capture an optical image of a polarized wave of the P-polarized component and an optical image of a polarized wave of the S-polarized component, as an optical image of the polarized wave in the first direction, while replacing the optical image of the polarized wave of the P-polarized component and the optical image of the polarized wave of the S-polarized component with each other depending on the angle of the passage region of the diaphragm; and
   a second image sensor configured to capture an optical image of a polarized wave of the S-polarized component and an optical image of a polarized wave of the P-polarized component, as an optical image of the polarized wave in the second direction, while replacing the optical image of the polarized wave of the S-polarized component and the optical image of the polarized wave of the P-polarized component with each other depending on the angle of the passage region of the diaphragm.

2. The apparatus according to claim 1, further comprising:
   a combining processing circuitry configured to combine optical images of 2n polarized waves of the P-polarized component and optical images of 2n polarized waves of the S-polarized component which have been image-captured for the each of the angle of the passage region; and
   a comparison processing circuitry configured to compare a first die image of a first die, where the optical images of the 2n polarized waves of the P-polarized component and the optical images of the 2n polarized waves of the S-polarized component are combined, with a second die image, corresponding to the first die image, of a second die on which same pattern as that of the first die is formed, where the optical images of the 2n polarized waves of the P-polarized component and the optical images of the 2n polarized waves of the S-polarized component are combined.

3. The apparatus according to claim 1, wherein the angle of the passage region of the diaphragm is defined by a central line of the passage region which passes through the central axis.

4. The apparatus according to claim 3, wherein,
   in a case where the angle of the passage region of the diaphragm is same as the first direction, the rotating half-wave plate converts the P-polarized component to the polarized wave in the first direction, and the S-polarized component to the polarized wave in the second direction, and
   in a case where the angle of the passage region of the diaphragm is same as the second direction, the rotating half-wave plate converts the P-polarized component to the polarized wave in the second direction, and the S-polarized component to the polarized wave in the first direction.

5. A pattern inspection apparatus comprising:
   a stage configured to be movable and to mount thereon a mask substrate for exposure on which a pattern is formed;
   an objective lens configured to receive a transmitted light having passed through the mask substrate;
   a diaphragm configured to be rotatable, to restrict a passage region of a light having passed through the objective lens to two regions opposite to each other with respect to a central axis in 4n equal regions divided rotationally symmetrically in a plane orthogonal to a traveling direction of the light having passed through the objective lens, and to change an angle of the passage region so that each the two regions of the 4n equal regions become passage regions in order;

a rotating half-wave plate configured to convert a P-polarized component having passed through the diaphragm and being in same direction as the angle of the passage region and an S-polarized component having passed through the diaphragm and being in a direction orthogonal to the angle of the passage region into a polarized wave in a first direction and a polarized wave in a second direction, where the first and second directions have been set previously and are orthogonal to each other;

a Rochon prism configured to separate a trajectory of the polarized wave in the first direction from a trajectory of the polarized wave in the second direction;

an image forming lens configured to focus and form an image of the polarized wave in the first direction having passed through the Rochon prism, at an image formation position, and an image of the polarized wave in the second direction having passed through the Rochon prism, at an other image formation position;

a mirror configured to reflect the polarized wave in the second direction, at the other image formation position of the polarized wave in the second direction which is different from the image formation position of the polarized wave in the first direction;

a first image sensor configured to capture an optical image of a polarized wave of the P-polarized component and an optical image of a polarized wave of the S-polarized component, as an optical image of the polarized wave in the first direction, while replacing the optical image of the polarized wave of the P-polarized component and the optical image of the polarized wave of the S-polarized component with each other depending on the angle of the passage region of the diaphragm;

a second image sensor configured to capture an optical image of a polarized wave of the S-polarized component and an optical image of a polarized wave of the P-polarized component, as an optical image of the polarized wave in the second direction, while replacing the optical image of the polarized wave of the S-polarized component and the optical image of the polarized wave of the P-polarized component with each other depending on the angle of the passage region of the diaphragm;

a beam splitter configured to branch an illumination light to go to the objective lens, and make a reflected light from the mask substrate pass through the beam splitter itself via the objective lens;

a first transfer mechanism configured to move the diaphragm, the rotating half-wave plate, and the Rochon prism between an inside and an outside of an optical path; and a second transfer mechanism configured to move the beam splitter between the inside and the outside of the optical path, wherein, the diaphragm, the rotating half-wave plate, and the Rochon prism are arranged instead of the beam splitter, in the optical path in a case where a polarized image is acquired, and the beam splitter is arranged instead of the diaphragm, the rotating half-wave plate, and the Rochon prism, in the optical path in a case where a pattern inspection is performed, the image forming lens, in the case where the pattern inspection is performed, focuses and forms an image of one of the transmitted light and the reflected light, at the image formation position of the polarized wave in the first direction, and focuses and forms an image of an other one of the transmitted light and the reflected light, at the other image formation position of the polarized wave in the second direction, the mirror, in the case where the pattern inspection is performed, reflects the other one of the transmitted light and the reflected light, at the other image formation position of the polarized wave in the second direction, the first image sensor, in the case where the pattern inspection is performed, captures the image of the one of the transmitted light and the reflected light, and the second image sensor, in the case where the pattern inspection is performed, captures the image of the other one of the transmitted light and the reflected light.

6. The apparatus according to claim 5, further comprising:
a combining processing circuitry configured to combine optical images of 2n polarized waves of the P-polarized component and optical images of 2n polarized waves of the S-polarized component which have been image-captured for the each of the angle of the passage region; and a comparison processing circuitry configured to compare a first die image of a first die, where the optical images of the 2n polarized waves of the P-polarized component and the optical images of the 2n polarized waves of the S-polarized component are combined, with a second die image, corresponding to the first die image, of a second die on which same pattern as that of the first die is formed, where the optical images of the 2n polarized waves of the P-polarized component and the optical images of the 2n polarized waves of the S-polarized component are combined.

7. The apparatus according to claim 5, wherein the angle of the passage region of the diaphragm is defined by a central line of the passage region which passes through the central axis.

8. The apparatus according to claim 7, wherein,
in a case where the angle of the passage region of the diaphragm is same as the first direction, the rotating half-wave plate converts the P-polarized component to the polarized wave in the first direction, and the S-polarized component to the polarized wave in the second direction, and in a case where the angle of the passage region of the diaphragm is same as the second direction, the rotating half-wave plate converts the P-polarized component to the polarized wave in the second direction, and the S-polarized component to the polarized wave in the first direction.

9. A polarized image acquisition method comprising:
focusing an illumination light to form an image on a mask substrate for exposure on which a pattern is formed;
receiving a transmitted light having passed through the mask substrate by focusing the illumination light, into an objective lens;
restricting a passage region of the transmitted light having passed through the objective lens, using a diaphragm being rotatable and including two open regions opposite to each other with respect to a central axis in 4n equal regions divided rotationally symmetrically in a plane orthogonal to a traveling direction of the transmitted light having passed through the objective lens, to the two open regions, and changing an angle of the passage region so that each the two open regions of the 4n equal regions become passage regions in order;

converting, by using a rotating half-wave plate, for each of the angle of the passage region, a P-polarized component which has passed through the diaphragm and is in same direction as the angle of the passage region and an S-polarized component which has passed through the diaphragm and is in a direction orthogonal to the angle of the passage region into a polarized wave in a first direction and a polarized wave in a second direction, where the first and second directions have been set previously and are orthogonal to each other;

separating a trajectory of the polarized wave in the first direction from a trajectory of the polarized wave in the second direction by using a Rochon prism;

focusing, by using an image forming lens, to form an image of the polarized wave in the first direction having passed through the Rochon prism, at an image formation position, and an image of the polarized wave in the second direction having passed through the Rochon prism, at an other image formation position;

reflecting, by using a mirror, the polarized wave in the second direction, at the other image formation position of the polarized wave in the second direction which is different from the image formation position of the polarized wave in the first direction;

capturing, by using a first image sensor, an optical image of a polarized wave of the P-polarized component and an optical image of a polarized wave of the S-polarized component, as an optical image of the polarized wave in the first direction, while replacing the optical image of the polarized wave of the P-polarized component and the optical image of the polarized wave of the S-polarized component with each other depending on the angle of the passage region of the diaphragm; and capturing, by using a second image sensor, an optical image of a polarized wave of the S-polarized component and an optical image of a polarized wave of the P-polarized component, as an optical image of the polarized wave in the second direction, while replacing the optical image of the polarized wave of the S-polarized component and the optical image of the polarized wave of the P-polarized component with each other depending on the angle of the passage region of the diaphragm.

10. A pattern inspection method comprising:

focusing a first illumination light to form an image on a mask substrate for exposure on which a pattern is formed;

receiving a first transmitted light having passed through the mask substrate by focusing the first illumination light, into an objective lens;

restricting a passage region of the first transmitted light having passed through the objective lens, by using a diaphragm being rotatable and including two open regions opposite to each other with respect to a central axis in 4n equal regions divided rotationally symmetrically in a plane orthogonal to a traveling direction of the first transmitted light having passed through the objective lens, to the two open regions, and changing an angle of the passage region so that each the two open regions of the 4n equal regions become passage regions in order;

converting, by using a rotating half-wave plate, for each of the angle of the passage region, a P-polarized component, which has passed through the diaphragm and is in same direction as the angle of the passage region, into a polarized wave in a first direction, and an S-polarized component, which has passed through the diaphragm and is in a direction orthogonal to the angle of the passage region, into a polarized wave in a second direction, where the first and second directions have been set previously and are orthogonal to each other;

separating, by using a Rochon prism, a trajectory of the polarized wave in the first direction from a trajectory of the polarized wave in the second direction;

focusing, by using an image forming lens, to form an image of the polarized wave in the first direction having passed through the Rochon prism, at an image formation position, and an image of the polarized wave in the second direction having passed through the Rochon prism, at an other image formation position;

reflecting, by using a mirror, the polarized wave in the second direction, at the other image formation position of the polarized wave in the second direction which is different from the image formation position of the polarized wave in the first direction;

capturing, by using a first image sensor, an optical image of a polarized wave of the P-polarized component and an optical image of a polarized wave of the S-polarized component, as an optical image of the polarized wave in the first direction, while replacing the optical image of the polarized wave of the P-polarized component and the optical image of the polarized wave of the S-polarized component with each other depending on the angle of the passage region of the diaphragm;

capturing, by using a second image sensor, an optical image of a polarized wave of the S-polarized component and an optical image of a polarized wave of the P-polarized component, as an optical image of the polarized wave in the second direction, while replacing the optical image of the polarized wave of the S-polarized component and the optical image of the polarized wave of the P-polarized component with each other depending on the angle of the passage region of the diaphragm;

moving the diaphragm, the rotating half-wave plate, and the Rochon prism from an inside to an outside of an optical path;

moving a beam splitter from the outside to the inside of the optical path;

illuminating the mask substrate with a second illumination light by using a transmission inspection illumination optical system;

illuminating the mask substrate with a third illumination light by using a reflection inspection illumination optical system;

receiving a second transmitted light having passed through the mask substrate by the second illumination light, and a reflected light having been reflected from the mask substrate by the third illumination light, into the image forming lens through the objective lens and the beam splitter;

focusing and imaging, by using the image forming lens, one of the second transmitted light and the reflected light, at the image formation position of the polarized wave in the first direction, and an other one of the second transmitted light and the reflected light, at the other image formation position of the polarized wave in the second direction;

reflecting, by using the mirror, the other one of the second transmitted light and the reflected light, at the other image formation position of the polarized wave in the second direction;

capturing, by using the first image sensor, an image of the one of the second transmitted light and the reflected light; and capturing, by using the second image sensor, an image of the other one of the second transmitted light and the reflected light.

* * * * *